United States Patent
Shiba et al.

(10) Patent No.: US 7,666,941 B2
(45) Date of Patent: Feb. 23, 2010

(54) AQUEOUS POLYOLEFIN RESIN DISPERSION, PROCESS FOR PRODUCING THE SAME, AND WATER-BASED COATING MATERIAL COMPRISING THE SAME

(75) Inventors: Kenjin Shiba, Uji (JP); Shoji Okamoto, Uji (JP); Masafumi Yamada, Uji (JP)

(73) Assignee: Unitika Ltd., Hyogo (JP)

(*) Notice: Subject to any disclaimer, the term of this patent is extended or adjusted under 35 U.S.C. 154(b) by 328 days.

(21) Appl. No.: 10/557,588

(22) PCT Filed: May 17, 2004

(86) PCT No.: PCT/JP2004/007009

§ 371 (c)(1),
(2), (4) Date: Nov. 17, 2005

(87) PCT Pub. No.: WO2004/104090

PCT Pub. Date: Dec. 2, 2004

(65) Prior Publication Data

US 2007/0037923 A1 Feb. 15, 2007

(30) Foreign Application Priority Data

| May 22, 2003 | (JP) | ............................. 2003-145426 |
| Jul. 23, 2003 | (JP) | ............................. 2003-278312 |

(51) Int. Cl.
| A61K 9/16 | (2006.01) |
| C08L 31/00 | (2006.01) |
| C08L 33/06 | (2006.01) |

(52) U.S. Cl. .................. 524/543; 524/556; 524/560
(58) Field of Classification Search .................. None
See application file for complete search history.

(56) References Cited

U.S. PATENT DOCUMENTS 5,624,996 A * 4/1997 Morinaga et al. ........... 524/556

FOREIGN PATENT DOCUMENTS

| JP | 1-28065 | 1/1982 |
| JP | 63-37102 | 2/1988 |
| JP | 2895574 | 2/1992 |
| JP | 2003-119328 | 4/2003 |
| JP | 2003-127265 | 5/2003 |

* cited by examiner

*Primary Examiner*—Sheeba Ahmed
(74) *Attorney, Agent, or Firm*—Fildes & Outland, P.C.

(57) ABSTRACT

An aqueous polyolefin resin dispersion, a process for producing the same, and a water-based coating material comprising the same are provided. The aqueous polyolefin resin dispersion contains a polyolefin resin containing 50 to 98% by mass of an unsaturated hydrocarbon having 3 to 6 carbon atoms and 0.5 to 20% by mass of an unsaturated carboxylic acid unit, and a basic compound, and contains substantially no water-compatibilizing agent having a boiling point of 185° C. or higher at normal pressure. The polyolefin resin has a number average particle size of 1 μm or smaller in the aqueous dispersion.

6 Claims, No Drawings

AQUEOUS POLYOLEFIN RESIN DISPERSION, PROCESS FOR PRODUCING THE SAME, AND WATER-BASED COATING MATERIAL COMPRISING THE SAME

TECHNICAL FIELD

The present invention relates to an aqueous polyolefin resin dispersion which does not contain a water-compatibilizing agent having a high boiling point and which is excellent in adhesion to various substrates, a process for producing the same and a water-based coating material comprising the same.

BACKGROUND ART

Polyolefin resins, particularly propylene resins, are excellent in electrical properties, mechanical properties, chemical properties, formability, cleanness and recyclability, and thus are used in large quantities mainly for automobiles, in electrical fields, and for packages and commodities. Generally, however, polyolefin resins have a disadvantage that coating and adhesion are difficult because it does not contain a polar group in the molecular chain. Thus, for coating and adhesion of propylene resin, a method using a resin containing a chlorinated polypropylene resin as a main component has been proposed. However, because chlorinated resins release harmful substances such as acid gas when burnt, it is recently strongly desired to make the shift to non-chlorine materials with increasing awareness of the environment. Thus, development of modified polyolefin resin modified by acid or the like is under way.

To use modified polyolefin resin for coating and adhesion, the resin must be liquefied, and for example, methods have been employed, such as a) using resin after melting, b) using resin dissolved or dispersed in an organic solvent and c) using resin dispersed in an aqueous medium. a), however, involves problems of limited application and difficulty in forming thin layer with respect to the melt viscosity of the resin. And when b) is compared with c), c) is preferred because use of organic solvent tends to be restricted by policies of environmental protection, resource saving, regulation of hazardous materials by law and improvement of work environment.

Under the above circumstances, preparation of an aqueous dispersion of a modified polyolefin resin has been actively studied. For example, JP-A-6-73250, JP-A-6-80738, JP-A-6-80844, JP-A-6-80845, JP-A-6-256592, JP-A-8-3376, JP-A-8-67726, JP-A-8-92427 and JP-B-2895574 disclose that various surfactants are used as essential components for dispersing a modified polyolefin resin (mainly polypropylene) in an aqueous medium in a stable manner. In addition, JP-B-2610559 discloses use of liquid polyol as an essential component.

However, surfactants as described above are non-volatile and remain in the coating film of the modified polyolefin resin even after drying, and when used in large quantities, they greatly reduce the water resistance of the coating film. Even in small amounts, interfacial conditions are dramatically changed and properties such as adhesion to a substrate are adversely affected. Moreover, the surfactant may bleed out from the coating film, and this not only is environmentally or hygienically detrimental but also may result in change in properties of the coating film overtime. Furthermore, because liquid polyol is highly hydrophilic, it is difficult to complete preparation of resin aqueous dispersion only by polyol. Actually, a surfactant is used together in JP-B-2610559. In that case, the above-described problems arise. Even if preparation of resin aqueous dispersion is successful only by liquid polyol by increasing the carboxyl group content of the resin, there is another problem. Specifically, because polyol has a high boiling point, it remains in a coating film in low temperature, short time drying and adversely affects properties of the coating film such as water resistance and adhesion to a substrate. Further, polyol may bleed out from the coating film, and this not only is environmentally or hygienically detrimental, but also may result in change in the properties of the coating film overtime. Moreover, because high temperature and long time drying is necessary for evaporating polyol, this technique is industrially disadvantageous and involves a problem of deformation of the substrate depending on conditions.

Under such circumstances, the present applicant has proposed a modified aqueous polyolefin resin dispersion which does not contain a non-volatile water-compatibilizing agent such as surfactant (JP-A-2003-119328). However, since modified polyethylene resin is used in this dispersion, adhesion to polypropylene resin needs to be improved although adhesion to nylon and polyethylene is excellent.

Now, water-based coating material is described. Non-chlorine polyolefin resins described above have also been applied to a water-based coating material as a binder. In particular, non-chlorine, water-based types are greatly demanded in food packaging films. Usually, food packaging films are prepared by applying a coating material on a substrate film and laminating a polyolefin resin film or the like.

On the other hand, lamination techniques include a method comprising applying a coating material to a substrate film, applying an anchor coating agent to the coated surface and laminating a molten resin on the anchor coat layer as an adhesive layer (extrusion lamination method), a method comprising laminating various films on the anchor coat layer as an adhesive layer (dry lamination method), and a method in which molten resin is directly laminated on the coated surface of the substrate film without using an anchor coating agent (hereinafter referred to as "direct lamination method"). Of these, the direct lamination method is advantageous from the aspects of economical efficiency, resource saving and environment.

In such situation, as coating materials using non-chlorine polyolefin resin, those described in JP-A-8-120205, JP-A-2002-226758 and JP-A-2003-313483 are known.

However, the coating materials described in these publications have a problem that they have poor adhesion to a propylene substrate when dried at a relatively low temperature of about room temperature. Further, those coating materials are still not suitable for direct lamination and need to be improved.

DISCLOSURE OF THE INVENTION

In view of the above-described circumstances, the present invention aims at providing an aqueous dispersion in which a modified polyolefin resin is finely and uniformly dispersed in an aqueous medium without adding a non-volatile compound or a high boiling point compound which remains in a coating film after drying, and which does not impair the properties of the modified polyolefin resin, and a coating material comprising the same. In particular, the present invention aims at providing a water-based coating material excellent in adhesion to various substrates and direct lamination suitability.

The present inventors have conducted intensive studies to solve the above-described problems and found that a polyolefin resin having a specific composition can be dispersed in an aqueous medium in a stable condition without adding a non-volatile water-compatibilizing agent such as surfactant or a water-compatibilizing agent having a high boiling point.

The present inventors have also found that an aqueous coating material containing the aqueous dispersion is excellent in adhesion to various substrates and direct lamination suitability, and reached the present invention.

The summary of the present invention is as follows.

(1) An aqueous polyolefin resin dispersion comprising a polyolefin resin containing 50 to 98% by mass of an unsaturated hydrocarbon having 3 to 6 carbon atoms and 0.5 to 20% by mass of an unsaturated carboxylic acid unit, and a basic compound, the aqueous dispersion containing substantially no water-compatibilizing agent having a boiling point of 185° C. or higher at normal pressure, wherein the polyolefin resin has a number average particle size of 1 µm or smaller in the aqueous dispersion.

(2) The aqueous polyolefin resin dispersion according to (1), wherein the unsaturated hydrocarbon having 3 to 6 carbon atoms contained in the polyolefin resin is propylene and/or butene.

(3) The aqueous polyolefin resin dispersion according to (1) or (2), wherein the polyolefin resin further contains ethylene.

(4) A resin layer obtained by removing a medium from an aqueous polyolefin resin dispersion according to any one of (1) to (3), which is formed on a substrate.

(5) A process for producing an aqueous polyolefin resin dispersion according to above (1), which comprises heating and stirring a polyolefin resin containing 50 to 98% by mass of an unsaturated hydrocarbon having 3 to 6 carbon atoms and 0.5 to 20% by mass of an unsaturated carboxylic acid unit, a basic compound, an organic solvent having a boiling point of lower than 185° C. at normal pressure and water in a closed vessel at 80 to 220° C.

(6) A water-based coating material comprising a polyolefin resin (A) containing 50 to 98% by mass of an unsaturated hydrocarbon having 3 to 6 carbon atoms and 0.5 to 20% by mass of an unsaturated carboxylic acid unit, and another resin (B) as required and a pigment or a dye (C), wherein the water-based coating material has a mass ratio of (A) to (B), (A)/(B), of 100/0 to 10/90, and the polyolefin resin (A) has a number average particle size of 1 µm or smaller.

(7) A processed article comprising a water-based coating material according to (6) applied to a substrate.

(8) The processed article according to (7), wherein the substrate is a thermoplastic resin film.

(9) A film comprising an easy-to-adhere layer having a thickness of 0.01 to 10 µm provided on at least one surface of a thermoplastic resin film and a water-based coating material according to (6) applied to the easy-to-adhere layer.

(10) A laminated film comprising a laminate layer provided on a coated surface of a thermoplastic resin film according to the above (8) or (9).

(11) A process for producing a laminated film, which comprises forming a laminate layer by laminating molten polyethylene or polypropylene on a coated surface of a thermoplastic resin film according to the above (8) or (9).

According to the present invention, an aqueous dispersion of a polyolefin resin having a specific composition can be obtained, which is finely dispersed to a number average particle size of 1 µm or smaller in a stable condition without adding a non-volatile water-compatibilizing agent such as surfactant or a water-compatibilizing agent having a high boiling point. Since a coating film formed from the aqueous dispersion does not contain a non-volatile water-compatibilizing agent such as surfactant or a water-compatibilizing agent having a high boiling point, inherent properties of polyolefin resin are not deteriorated. In particular, the coating film is excellent in water resistance, adhesion to substrates and heat sealing properties even in low temperature and short time drying, and there is little change in these properties over long time. Thus, the aqueous dispersion is suitable for various coating agents, paints, inks and binders for adhesives. The water-based coating material containing the aqueous polyolefin resin dispersion of the present invention is excellent in adhesion to various substrates and direct lamination suitability. In addition, the production process of the present invention contributes to simplification of equipment and reduction of costs because a high speed stirrer such as a homogenizer or a mixer type emulsifying apparatus needs not be used.

BEST MODE FOR CARRYING OUT THE INVENTION

The present invention is described in detail below.

First, polyolefin resin is described.

The polyolefin resin in the present invention is a non-chlorine polyolefin resin containing 50 to 98% by mass, preferably 60 to 98% by mass, more preferably 70 to 98% by mass, further preferably 80 to 98% by mass, of an unsaturated hydrocarbon having 3 to 6 carbon atoms. When the content of the unsaturated hydrocarbon having 3 to 6 carbon atoms is less than 50% by mass, adhesion to polyolefin materials such as polypropylene is decreased, and when the content is more than 98% by mass, preparation of aqueous dispersion of resin becomes difficult because the content of the unsaturated carboxylic acid unit described later is relatively decreased. Examples of unsaturated hydrocarbons having 3 to 6 carbon atoms include alkenes such as propylene, 1-butene, isobutene, 1-pentene, 4-methyl-1-pentene, 3-methyl-1-pentene and 1-hexene and dienes such as butadiene and isoprene. Of these, propylene components or butene components (1-butene, isobutene) are preferred from the aspects of ease in production of resin, ease in preparation of aqueous dispersion, adhesion to various materials and blocking properties, and both can be used together. The polyolefin resin in the present invention preferably further contains 2 to 50% by mass of an ethylene component in addition to the above-described unsaturated hydrocarbon having 3 to 6 carbon atoms. When the polyolefin resin contains the ethylene component, preparation of aqueous dispersion of resin is facilitated and film properties are improved.

A particularly preferred structure of the polyolefin resin in the present invention is a resin containing three components of a propylene component, a butene component and an ethylene component. The component ratio is 8 to 90 parts by mass of the propylene component, 8 to 90 parts by mass of the butene component and 2 to 50 parts by mass of the ethylene component based on the total of the three components of 100 parts by mass.

The types of copolymerization of the components of the above-described polyolefin resin are not particularly limited, and examples thereof include random copolymerization and block copolymerization. In view of ease in polymerization, random copolymerization is preferred. Two or more kinds of polyolefin resins mixed at a component ratio defined in the present invention may also be used.

In addition to the above-described components, another component may be contained in an amount of about 20% by mass or less based on the total of the polyolefin resin. Examples of other components include alkenes and dienes having 6 or more carbon atoms such as 1-octene and norbornene, (meth)acrylic esters such as methyl (meth)acrylate, ethyl (meth)acrylate and butyl (meth)acrylate, maleates such as dimethyl maleate, diethyl maleate and dibutyl maleate, (meth)acrylic amides, alkyl vinyl ethers such as methyl vinyl ether and ethyl vinyl ether, vinyl esters such as vinyl formate, vinyl acetate, vinyl propionate, vinyl pivalate and vinyl versatate, vinyl alcohols obtained by saponifying vinyl ester by a basic compound, 2-hydroxyethyl acrylate, glycidyl(meth) acrylate, (meth)acrylonitrile, styrene, substituted styrene, halogenated vinyl, halogenated vinylidene, carbon monoxide and sulfur dioxide, and a mixture of these may also be used.

Of these, (meth)acrylic ester is preferably contained because aqueous dispersion can be easily prepared and adhesion to various substrates is improved. Specific examples of (meth)acrylic esters include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, dodecyl (meth)acrylate and stearyl (meth)acrylate.

The polyolefin resin in the present invention must contain 0.5 to 20% by mass of an unsaturated carboxylic acid unit in the polyolefin resin structure in view of dispersibility. The content of the unit is preferably 0.5 to 15% by mass, more preferably 0.5 to 12% by mass, further preferably 1 to 10% by mass, and particularly preferably 1 to 8% by mass. When the content of the unsaturated carboxylic acid unit is less than 0.5% by mass, preparation of aqueous dispersion of polyolefin resin tends to be difficult, and when the content is more than 20% by mass, adhesion to polyolefin resin materials such as polypropylene tends to be decreased although preparation of aqueous dispersion of the resin is easy.

The unsaturated carboxylic acid unit is derived from unsaturated carboxylic acid or anhydride thereof. Specific examples thereof include acrylic acid, methacrylic acid, maleic acid, maleic anhydride, itaconic acid, itaconic anhydride, aconitic acid, aconitic anhydride, fumaric acid, crotonic acid, citraconic acid, mesaconic acid and allyl succinic acid, and in addition, compounds having at least one carboxylic group or acid anhydride group in the molecule (in a monomer unit) such as half esters of unsaturated dicarboxylic acid and half amides. Of these, in view of ease in introduction into polyolefin resin, maleic anhydride, acrylic acid and methacrylic acid are preferred, and maleic anhydride is more preferred. Such unsaturated carboxylic acid unit is copolymerized in the polyolefin resin, and types of copolymerization include random copolymerization, block copolymerization and graft copolymerization, which are not particularly limited. The acid anhydride unit introduced into the polyolefin resin tends to be in the form of acid anhydride in a dry state while it tends to be in the form of carboxylic acid or a salt thereof in an aqueous medium containing a basic compound described later due to partial or complete ring opening of the acid anhydride.

The method of introducing an unsaturated carboxylic acid unit into the polyolefin resin is not particularly limited. Examples thereof include methods of graft copolymerizing an unsaturated carboxylic acid unit to the polyolefin resin, such as a method in which polyolefin resin and unsaturated carboxylic acid are allowed to react by melting under heating to the melting point or higher of the polyolefin resin in the presence of a radical generator, and a method in which polyolefin resin is dissolved in an organic solvent and then allowed to react by heating and stirring in the presence of a radical generator. The former method is preferred because the operation is easy.

Examples of radical generators used for graft copolymerization include organic peroxides such as di-tert-butyl peroxide, dicumyl peroxide, tert-butyl hydroperoxide, tert-butyl-cumyl peroxide, benzoyl peroxide, dilauryl peroxide, cumene hydroperoxide, tert-butyl peroxybenzoate, ethyl ethyl ketone peroxide and di-tert-butyl diperphthalate, and azonitriles such as azobisisobutyronitrile. These may be appropriately selected for use depending on the reaction temperature.

The polyolefin resin has a weight average molecular weight of preferably 5,000 to 150,000, more preferably 20,000 to 120,000, further preferably 30,000 to 100,000, particularly preferably 35,000 to 90,000, and most preferably 40,000 to 80,000. When the weight average molecular weight is less than 5,000, adhesion to substrates may be decreased and the obtained coating film tends to be hard and brittle. When the weight average molecular weight is more than 150,000, preparation of aqueous dispersion of the resin tends to be difficult. The weight average molecular weight of the resin is determined using gel permeation chromatography (GPC) based on a standard polystyrene resin.

In the aqueous dispersion of the present invention, the above-described polyolefin resin is dispersed or dissolved in an aqueous medium. Here, the aqueous medium is a liquid containing water as a main component, which may contain a water-soluble organic solvent or a basic compound described later.

The polyolefin resin particles dispersed in the aqueous dispersion in the present invention need to have a number average particle size of 1 μm or smaller. The particles have a number average particle size of preferably 0.5 μm or smaller, more preferably 0.005 to 0.3 μm, further preferably 0.005 to 0.2 μm in view of film formability at low temperatures and color tones of coating films. When the number average particle size is more than 1 μm, the film formability at low temperatures may be remarkably decreased and the storage stability of the aqueous dispersion may be decreased. In addition, the particles have a weight average particle size of preferably 2 μm or smaller, more preferably 1 μm or smaller, further preferably 0.005 to 0.5 μm, and particularly preferably 0.01 to 0.3 μm in view of film formability at low temperatures and storage stability. By reducing the particle size, adhesion, film formability at low temperatures and color tones of coating films are improved.

The number average particle size and the weight average particle size of polyolefin resin are measured by dynamic light scattering which is generally used for measuring the particle size of fine particles.

The content of a resin in the aqueous dispersion of the present invention is not particularly limited and may be accordingly selected depending on film forming conditions, thickness and properties of the intended coating film of the resin. However, in order to maintain a moderate viscosity of the coating composition and to achieve an excellent film forming property, the content is preferably 1 to 60% by mass, more preferably 3 to 55% by mass, further preferably 5 to 50% by mass, and particularly preferably 10 to 45% by mass.

The aqueous dispersion of the present invention has a feature that it virtually does not contain a water-compatibilizing agent having a boiling point of 185° C. or higher at normal pressure. The normal pressure means atmospheric pressure. Because of this, the coating film properties in the case of low temperature drying, in particular, water resistance, adhesion to substrates and heat sealing properties are excellent and there is little change in these properties over long time. The boiling point in the present specification generally refers to a boiling point at normal pressure. Water-compatibilizing agents which do not have a boiling point at normal pressure are categorized as the water-compatibilizing agent having a boiling point of 185° C. or higher according to the present invention.

Herein, the "water-compatibilizing agent" refers to agents or compounds added to facilitate the preparation of aqueous dispersion and stabilize the aqueous dispersion when producing the same.

"Containing substantially no water-compatibilizing agent having a boiling point of 185° C. or higher at normal pressure" means that such agent is not used in production (preparation of resin aqueous dispersion) and therefore the obtained dispersion does not contain the agent. Thus, the content of such water-compatibilizing agent is preferably zero, but about less than 0.1% by mass thereof may be contained based on the polyolefin resin component as long as the advantages of the present invention are not impaired.

Examples of water-compatibilizing agents having a boiling point of 185° C. or higher at normal pressure in the present invention include surfactants, compounds serving as protective colloid, modified waxes, acid modified compounds having a high acid value, water-soluble polymers and polyols described below.

Examples of surfactants include cationic surfactants, anionic surfactants, nonionic surfactants, amphoteric surfactants, fluorine surfactants and reactive surfactants, and in addition to those generally used for emulsion polymerization, emulsifiers may also be included. For example, anionic surfactants include sulfate salts of higher alcohols, higher alkyl sulfonic acid and salts thereof, higher carboxylic acids such as oleic acid, stearic acid and palmitic acid and salts thereof, alkyl benzene sulfonic acid and salts thereof, polyoxyethylene alkylsulfate salts, polyoxyethylene alkyl phenyl ether sulfate salts and vinyl sulfosuccinate. Examples of nonionic surfactants include compounds having a polyoxyethylene structure such as polyoxyethylene alkyl ethers, polyoxyethylene alkyl phenyl ethers, polyethylene glycol fatty acid esters, ethylene oxide-propylene oxide block copolymers, polyoxyethylene fatty acid amides and ethylene oxide-propylene oxide copolymers, and sorbitan derivatives such as polyoxyethylene sorbitan fatty acid esters. Examples of amphoteric surfactants include lauryl betaine and lauryl dimethylamine oxide. Examples of reactive surfactants include compounds containing a reactive double bond such as alkylpropenylphenol polyethylene oxide adducts and sulfate salts thereof, allylalkyl phenol polyethylene oxide adducts and sulfate salts thereof, and allyldialkyl phenol polyethylene oxide adducts and sulfate salts thereof.

Examples of compounds serving as protective colloid, modified waxes, acid modified compounds having a high acid value and water-soluble polymers include polyvinyl alcohols, carboxyl group modified polyvinyl alcohols, carboxymethylcellulose, hydroxyethylcellulose, hydroxypropylcellulose, modified starch, polyvinyl pyrrolidone, polyacrylic acid and salts thereof, acid modified polyolefin waxes having a weight average molecular weight of usually not more than 5,000 such as carboxyl group-containing polyethylene wax, carboxyl group-containing polypropylene wax and carboxyl group-containing polyethylene-propylene wax, and salts thereof, acrylic acid-maleic anhydride copolymers and salts thereof, carboxyl group-containing polymers containing 20% by mass or more of unsaturated carboxylic acid such as styrene-(meth)acrylic acid copolymers, ethylene-(meth)acrylic acid copolymers, isobutylene-maleic anhydride alternating copolymers and (meth)acrylic acid-(meth)acrylic ester copolymers and salts thereof, polyitaconic acid and salts thereof, water-soluble acrylic copolymers containing an amino group, gelatin, gum arabic and casein, which are generally used as dispersion stabilizer of fine particles.

Examples of polyols having a boiling point of 185° C. or higher include diols, polyoxyalkylene diols, polyhydric alcohols, polyester polyols, acrylic polyols and polyurethane polyols, which are more specifically ethylene glycol, diethylene glycol, triethylene glycol, propylene glycol, butanediol and glycerol.

The aqueous dispersion of the present invention contains a basic compound. The basic compound neutralizes part or all of the carboxyl groups of a polyolefin resin, and electrical repulsion between generated carboxyl anions prevents agglomeration of fine particles to impart stability to the aqueous dispersion. Such basic compound has a boiling point of preferably lower than 185° C. at normal pressure in view of water resistance and drying characteristics. When the boiling point is 185° C. or higher, the compound is difficult to be removed from the resin coating film by drying, and this may result in decrease in water resistance and adhesion to substrates of the coating film in the case of low temperature drying.

The basic compound having a boiling point of lower than 185° C. is not particularly limited and specific examples thereof include ammonia, triethylamine, N,N-dimethylethanolamine, isopropylamine, aminoethanol, dimethylaminoethanol, diethylaminoethanol, ethylamine, diethylamine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine.

The basic compound is added in an amount of preferably 0.5 to 3.0 equivalents, more preferably 0.8 to 2.5 equivalents, particularly preferably 0.9 to 2.0 equivalents based on the amount of carboxyl groups in the polyolefin resin. When the amount is less than 0.5 equivalents, addition of the basic compound produces no effect, and when the amount is more than 3.0 equivalents, drying time in film forming becomes long and the stability of aqueous dispersion is reduced.

In the present invention, an organic solvent is preferably added upon preparation of aqueous dispersion of polyolefin resin so as to facilitate the preparation of aqueous dispersion and reduce the particle size of the dispersion. The organic solvent is used in an amount of preferably not more than 50% by mass, more preferably 1 to 45% by mass, further preferably 2 to 40% by mass, and particularly preferably 3 to 35% by mass in the aqueous medium. When the amount of the organic solvent is more than 50% by mass, the medium is substantially not an aqueous medium, and not only it is contrary to one of the objects of the present invention (environmental protection), but also the stability of the aqueous dispersion may be reduced depending on the organic solvent to be used.

To obtain a better aqueous dispersion, an organic solvent having solubility in water of not less than 10 g/L at 20° C. is preferably used. The solubility is further preferably not less than 20 g/L and particularly preferably not less than 50 g/L.

An organic solvent having a boiling point at normal pressure of lower than 185° C., particularly not lower than 50° C. and lower than 185° C. is preferred because it can be easily removed from the coating film. Organic solvents having a boiling point of 185° C. or higher is difficult to be removed from the coating film by drying, and this may particularly result in decrease in water resistance and adhesion to substrates of the coating film in the case of low temperature drying.

Specific examples of organic solvents to be used include alcohols such as methanol, ethanol, n-propanol, isopropanol, n-butanol, isobutanol, sec-butanol, tert-butanol, n-amyl alcohol, isoamylalcohol, sec-amylalcohol, tert-amylalcohol, 1-ethyl-1-propanol, 2-methyl-1-butanol, n-hexanol and cyclohexanol, ketones such as methyl ethyl ketone, methyl isobutyl ketone, ethyl butyl ketone and cyclohexanone, ethers such as tetrahydrofuran and dioxane, esters such as ethyl acetate, n-propylacetate, isopropylacetate, n-butylacetate, isobutyl acetate, sec-butyl acetate, 3-methoxybutyl acetate, methyl propionate, ethyl propionate, diethyl carbonate and dimethyl carbonate, glycol derivatives such as ethylene glycol monomethyl ether, ethylene glycol monoethyl ether, ethylene glycol monopropyl ether, ethylene glycol monobutyl ether and ethylene glycol ethyl ether acetate, 1-methoxy-2-propanol, 1-ethoxy-2-propanol, 3-methoxy-3-methyl-1-butanol, methoxybutanol, acetonitrile, dimethylformamide, dimethylacetamide, diacetone alcohol, ethyl acetoacetate, 1,2-dimethyl glycerine, 1,3-dimethyl glycerine and trimethylglycerine. These organic solvents may be used in a mixture of two or more kinds.

Of the above-described organic solvents, ethanol, n-propanol, isopropanol, n-butanol, methyl ethyl ketone, cyclohexanone, tetrahydrofuran, dioxane, ethylene glycol monoethyl ether, ethylene glycol monopropyl ether, ethylene glycol monobutyl ether and diethylene glycol monomethyl ether are preferred because they are highly effective for advancing the preparation of resin aqueous dispersion. Among them, organic solvents having one hydroxyl group in the molecule is more preferred, and ethylene glycol alkyl ethers are further preferred because an aqueous dispersion of resin can be prepared even by adding a small amount of such solvent.

When the above-described organic solvent is used for producing an aqueous dispersion, part of the solvent is removed from the system by removal of solvent called "stripping" after preparation of resin aqueous dispersion so as to reduce the amount of the organic solvent. Due to stripping, the content of the organic solvent in the aqueous dispersion can be 10% by mass or less, and an organic solvent content of 5% by mass or less is preferable from an environmental viewpoint. Substantially all of the organic solvent used for preparing aqueous dispersion can be removed therefrom in the stripping process, but this requires increase in the decompression degree and extension of the operation time. Thus, in view of production efficiency, the lower limit of the amount of the organic solvent is about 0.01% by mass. However, even if the amount of the organic solvent is less than 0.01% by mass, there is no significant influence on properties and the obtained resin can be suitably used.

Examples of methods of stripping include a method of removing an organic solvent by heating an aqueous dispersion with stirring at normal pressure or under reduced pressure. As removal of aqueous medium increases solid concentration, water may be previously added to the aqueous dispersion in such a case where the viscosity is increased and operationability is reduced.

The process for producing an aqueous polyolefin resin dispersion will now be described.

The process for producing an aqueous polyolefin resin dispersion of the present invention is not particularly limited, and a process may be employed, which comprises heating and stirring the components described above, i.e., a polyolefin resin, a basic compound, an aqueous medium, and if necessary, an organic solvent in a hermetically sealable container, and this is the most preferable. This process eliminates the need of adding a water-compatibilizing agent having a boiling point of 185° C. or higher.

As a container, apparatuses such as a solid/liquid mixer and emulsifier which are widely known by those skilled in the art may be used, and an apparatus which can apply a pressure of 0.1 MPa or higher is preferably used. The stirring method and the stirring speed are not particularly limited, and stirring may be performed at a low speed such that the resin floats in the aqueous medium. Thus, high-speed stirring (e.g., 1,000 rpm or higher) is not required, and aqueous dispersion can be produced by a simple apparatus.

Raw materials of polyolefin resin, aqueous medium and the like are introduced into the above-described apparatus and they are mixed with stirring at a temperature of preferably not higher than 40° C. Subsequently, with maintaining the temperature of the vessel at 60 to 220° C., preferably 80 to 200° C., further preferably 100 to 190° C., and particularly preferably 100 to 180° C., stirring is preferably continued until coarse particles disappear (e.g., for 5 to 120 minutes) so that the preparation of an aqueous dispersion of the polyolefin resin is sufficiently promoted. Then, by cooling to 40° C. or lower preferably with stirring, an aqueous dispersion is obtained. When the temperature of the vessel is lower than 60° C., preparation of aqueous dispersion of polyolefin resin is difficult. When the temperature of the vessel is higher than 220° C., the molecular weight of polyolefin resin may be decreased.

Then, the dispersion may be further subjected to jet grinding according to need. Jet grinding refers to a technique for preparing finer grains of resin particles by mechanical force by jetting an aqueous polyolefin resin dispersion through minute pores of a nozzle or a slit at a high pressure so that resin particles collide with each other or against a collision board. Examples of such apparatus include homogenizers made by A. P. V. GAULIN and Microfluidizer M-110E/H made by MIZUHO Industrial CO., LTD.

The solid concentration of the aqueous dispersion obtained as above may be controlled, for example, by removing aqueous medium or diluting with water to the desired solid concentration.

By employing the above-described production process, an aqueous dispersion of the present invention in which polyolefin resin is dispersed or dissolved in an aqueous medium can be obtained as homogeneous liquid. Here, "homogeneous liquid" refers to a state such that an aqueous dispersion does not contain portions of precipitation, phase separation or skinning in which the solid concentration is different from that of other portions.

Application of the aqueous polyolefin resin dispersion of the present invention will now be described.

Since the aqueous dispersion of the present invention is excellent in film formability, a uniform resin coating film can be formed on the surface of a substrate by uniformly coating the aqueous dispersion to the surface of various substrates by a usual film forming method, e.g., gravure roll coating, reverse roll coating, wire bar coating, lip coating, air knife coating, curtain flow coating, spray coating, immersion coating or brush coating and, if necessary, setting at about room temperature, and then subjecting the resultant to heat treatment for drying or drying and baking. At this stage, a usual oven with internal air circulation or infrared heater may be used as a heating apparatus. The heating temperature and the heating time are appropriately determined based on the properties of substrates on which the dispersion is coated or types and mixing amounts of curing agent described later. In view of economical efficiency, the heating temperature is preferably 30 to 25° C., more preferably 60 to 230° C., particularly preferably 80 to 210° C. The heating time is preferably 1 second to 20 minutes, more preferably 5 seconds to 15 minutes, particularly preferably 5 seconds to 10 minutes. In the case that a crosslinking agent is added thereto, it is desired that the heating temperature and the heating time are appropriately determined based on the types of crosslinking agent in order to thoroughly promote the reaction between carboxyl groups in the polyolefin resin and the crosslinking agent.

The coating amount of the aqueous dispersion of the present invention is appropriately determined based on its use, and the coating amount after drying is preferably 0.01 to 100 g/m$^2$, more preferably 0.1 to 50 g/m$^2$, particularly preferably 0.2 to 30 g/m$^2$. When a film is formed so that the coating amount is in the range of 0.01 to 100 g/m$^2$, a highly homogeneous resin coating film can be obtained.

To control the coating amount, it is preferable to use an aqueous dispersion having a concentration suitable for the thickness of the intended resin coating film, in addition to appropriately selecting the apparatus for coating and conditions of use thereof. The concentration can be adjusted according to the composition of charge upon preparation. The concentration may also be adjusted by appropriately diluting or concentrating an aqueous dispersion once prepared.

To further improve properties, an aqueous dispersion of another polymer, a tackifier, inorganic particles, a crosslinking agent, a pigment or a dye may be added to the aqueous dispersion of the present invention.

The aqueous dispersion of another polymer is not particularly limited, and examples thereof include aqueous dispersions of polyvinyl acetate, ethylene-vinyl acetate copolymer, polyvinyl chloride, polyvinylidene chloride, ethylene-(meth) acrylic acid copolymer, ethylene-(meth)acrylic ester-maleic anhydride copolymer, styrene-maleic acid resin, styrene-butadiene resin, butadiene resin, acrylonitrile-butadiene resin, poly(meth)acrylonitrile resin, (meth)acrylamide resin, chlorinated polyethylene resin, chlorinated polypropylene resin, polyester resin, modified nylon resin, urethane resin, tackifying resin such as rosin, phenol resin, silicone resin or epoxy resin. These may be used in a mixture of two or more.

As inorganic particles, a metal oxide such as magnesium oxide, zinc oxide or tin oxide, inorganic particles such as calcium carbonate or silica, or an inorganic layered compound such as vermiculite, montmorillonite, hectorite, hydrotalcite or synthetic mica may be added. The average particle size of these inorganic particles is preferably 0.005 to 10 μm, more preferably 0.005 to 5 μm from the aspect of the stability of the aqueous dispersion. These inorganic particles may be used in a mixture of two or more kinds. Zinc oxide may be used for ultraviolet screening and tin oxide may be used for preventing static electricity.

To further improve various film properties such as water resistance and solvent resistance, 0.01 to 80 parts by mass, preferably 0.1 to 50 parts by mass, more preferably 0.5 to 30 parts by mass of a crosslinking agent may be added to the aqueous dispersion based on 100 parts by mass of the resin in the aqueous dispersion. When the amount of the crosslinking agent is less than 0.01 parts by mass, the degree of improvement of film properties is low, and when the amount is more than 80 parts by mass, properties such as processability are decreased. As a crosslinking agent, self-crosslinking agents, compounds containing a plurality of functional groups reactive with a carboxyl group in the molecule and metal having multiple coordination sites maybe used. Of these, isocyanate compounds, melamine compounds, urea compounds, epoxy compounds, carbodiimide compounds, oxazoline group-containing compounds, zirconium salt compounds and silane coupling agents are preferred. These crosslinking agents may be used in combination.

Agents such as leveling agents, defoaming agents, antipopping agents, pigment dispersants, ultraviolet absorbers, thickeners, weather proofing agents and flame retardants may be added to the aqueous dispersion of the present invention according to need.

Since the resin composition obtained from the aqueous dispersion of the present invention is excellent in adhesion to various substrates, e.g., metal, glass, plastic molding, film, synthetic paper and paper, the resin composition is suitable as a coating agent, a primer, a paint (ink) or an adhesive used for such substrates. Of these, use as a primer or a paint (ink) is particularly preferred, and use as a paint (ink) is most preferred, because of the excellent adhesion to those substrates and suitability for direct lamination.

The water-based coating material containing the aqueous polyolefin resin dispersion of the present invention will now be described.

The water-based coating material of the present invention may contain another resin (B) as a resin component in addition to polyolefin resin (A). The mass ratio of (A) to (B), (A)/(B), is in the range of 100/0 to 10/90, preferably 99/1 to 15/85, more preferably 97/2 to 20/80, and further preferably 95/5 to 25/75. A water-based coating material containing only polyolefin resin (A) has excellent adhesion to various substrates and direct lamination properties, but by mixing another resin, the tack resistance and the adhesion to specific substrates can be further improved.

The other resin (B) is not particularly limited as long as it is usable in an aqueous dispersion, and the resins described above may be used. In particular, acrylic resin, polyurethane resins and polyester resins are preferred due to their weatherability, abrasion resistance, color retention and economical efficiency.

Examples of the above acrylic resins include homopolymerized or copolymerized resins of (meth) acrylic acid alkyl esters such as methyl (meth)acrylate, ethyl (meth)acrylate, butyl (meth)acrylate, 2-ethylhexyl (meth)acrylate and lauryl (meth)acrylate, and copolymerized resins of the above-described (meth)acrylic acid alkyl esters and (meth)acrylic acid hydroxy esters such as hydroxyethyl (meth)acrylate, hydroxypropyl (meth)acrylate and hydroxybutyl (meth)acrylate, olefins such as ethylene, propylene, isobutylene, 1-butene, styrene and methyl styrene, vinyl esters such as vinyl formate, vinyl acetate, vinyl propionate, vinyl pivalate and vinyl versatate, halogenated vinyl compounds such as vinyl chloride and vinylidene chloride, carboxylic acids such as acrylic acid, methacrylic acid, maleic acid, itaconic acid, fumaric acid and crotonic acid, nitriles such as (meth)acrylonitrile, and amides such as (meth)acrylamide, N-methylolacrylamide, N,N-dimethylacrylamide and N-isopropylacrylamide.

Of these, as a vinyl acetate resin, a homopolymer of vinyl acetate or a copolymer thereof with ethylene, dibutyl maleate, dibutyl fumarate, vinyl propionate, vinyl pivalate or vinyl versatate may be used.

The a polyurethane resin is a resin containing a urethane bond in the main chain, for example, one obtained by the reaction of a polyol compound and a polyisocyanate compound. A polyurethane resin having an anionic group is preferred in view of dispersibility in an aqueous medium. In this regard, the anionic group refers to a functional group converted to an anion in an aqueous medium, such as a carboxyl group, a sulfonic acid group, a sulfate group and a phosphate group.

The polyol component constituting the polyurethane resin is not particularly limited, and includes water, low molecular weight glycols such as ethylene glycol, diethylene glycol, triethylene glycol, 1,3-butanediol, 1,4-butanediol, 1,2-propanediol, 1,3-propanediol, 1,6-hexanediol, neopentyl glycol, 1,4-cyclohexanedimethanol, methyl-1,5-pentanediol, 1,8-octanediol, 2-ethyl-1,3-hexanediol, diethylene glycol, triethylene glycol and dipropylene glycol, low molecular weight polyols such as trimethylolpropane, glycerin and pentaerythritol, polyol compounds having an ethylene oxide or propylene oxide unit, high molecular weight diols such as polyether diols and polyester diols, bisphenols such as bisphenol A and bisphenol F and dimer diols in which a carboxyl group of dimer acid is converted to a hydroxyl group.

On the other hand, as a polyisocyanate component, one or a mixture of two or more of known aromatic, aliphatic or alicyclic diisocyanates may be used. Specific examples of diisocyanate include tolylene diisocyanate, 4,4'-diphenylmethane diisocyanate, 1,3-phenylene diisocyanate, hexamethylene diisocyanate, xylylene diisocyanate, 1,5-naphthylene diisocyanate, isophorone diisocyanate, dimeryl diisocyanate, lysine diisocyanate, hydrogenated 4,4'-diphenylmethane diisocyanate, hydrogenated tolylene diisocyanate, dimer diisocyanate in which a carboxyl group of dimer acid is converted to an isocyanate group, and adducts thereof, biuret types or isocyanurate types thereof. Additionally, as diisocyanate, tri- or higher functional polyisocyanates such as triphenylmethane triisocyanate and polymethylene polyphenyl isocyanate may be used.

To introduce an anionic group into a polyurethane resin, a polyol component containing a carboxyl group, a sulfonic group, a sulfate group or a phosphate group may be used.

Examples of polyol compounds containing a carboxyl group include 3,5-dihydroxybenzoic acid, 2,2-bis(hydroxymethyl)propionic acid, 2,2-bis(hydroxyethyl)propionic acid, 2,2-bis(hydroxypropyl)propionic acid, bis(hydroxymethyl) acetic acid, bis(4-hydroxyphenyl) acetic acid, 2,2-bis(4-hydroxyphenyl)pentanoic acid, tartaric acid, N,N-dihydroxyethylglycin and N,N-bis(2-hydroxyethyl)-3-carboxyl-propionamide.

The molecular weight of the polyurethane resin can be accordingly adjusted using a chain extender. Examples of chain extenders include compounds reactive with an isocyanate group having two or more active hydrogens derived from an amino group or a hydroxyl group, and for example, diamine compounds, dihydrazide compounds and glycols may be used.

A polyester resin which is the other resin (B) described above is composed of a dicarboxylic acid component and a diol component. Examples of dicarboxylic acids include terephthalic acid, isophthalic acid, phthalic acid, maleic acid, adipic acid, sebacic acid, palmitic acid and 1,4-cyclohexane dicarboxylic acid. Examples of diols include ethylene glycol, 1,2-propanediol, 1,3-propanediol, 1,4-butanediol, diethylene glycol, neopentyl glycol, 1,4-cyclohexane dimethanol and triethylene glycol. Where necessary, a tri- or higher functional acid or alcohol component, i.e., trimellitic acid, pyromellitic acid, glycerin, trimethylolpropane or pentaerythritol may be copolymerized therewith. The polyester resin may be a biodegradable polyester resin such as polyglycolic acid, polylactic acid, polycaprolactone, polybutylene succinate and polyethylene succinate.

The water-based coating material may also contain a pigment Or a dye. The pigment and the dye are not particularly limited as long as they are commonly used in the field of paint. Examples of pigments include inorganic pigments such as titanium dioxide, zincoxide, chromium oxide, cadmium sulfide, calcium carbonate, barium carbonate, barium sulfate, clay, talc, chrome yellow, iron oxide and carbon black, and organic pigments such as azo pigments, diazo pigments, condensed azo pigments, thioindigo pigments, indanthrone pigments, quinacridone pigments, anthraquinone pigments, benzimidazole pigments, perylene pigments, perynone pigments, phthalocyanine pigments, halogenated phthalocyanine pigments, anthrapyridine pigments and dioxane pigments. Examples of dyes include direct dye, reactive dye, acid dye, cationic dye, vat dye and mordant dye. The above-described pigment or dye may be used alone or in a combination of two or more. The content of the pigment or the dye is 10 to 600 parts by mass, more preferably 20 to 400 parts by mass based on 100 parts by mass of the total of the resins (A) and (B) to be effective as a paint. When the content is more than 600 parts by mass, sufficient adhesion and direct lamination suitability cannot be obtained.

To further improve properties such as solvent resistance, a crosslinking agent may be mixed to the water-based coating material of the present invention. The mixing ratio of the crosslinking agent is in the range of preferably 0.1 to 30 parts by mass, more preferably 0.1 to 20 parts by mass based on 100 parts by mass of the total of the resins (A) and (B). When the amount is less than 0.1 part by mass, addition thereof produces little effect, and when the amount is more than 30 parts by mass, adhesion to substrates and direct lamination suitability tend to be decreased. As a crosslinking agent, self-crosslinking compounds, compounds containing a plurality of functional groups reactive with a carboxyl group in the molecule and metal salts having multiple coordination sites may be used. For example, isocyanate compounds, melamine compounds, urea compounds, epoxy compounds, carbodiimide compounds, oxazoline group-containing compounds, zirconium salt compounds and silane coupling agents are preferred. These crosslinking agents may be used alone or in a combination of two or more.

A pigment dispersant, a wetting agent, a defoaming agent, a thickener, a freezing and thawing stabilizer, a film forming aid, an antiseptic, a fungicide, a rust proofing agent, a plasticizer, an antioxidant, an ultraviolet absorber or a radical scavengers may be added to the water-based coating material of the present invention within the range in which the properties of the water-based coating material are not damaged.

The process for producing the water-based coating material of the present invention is not particularly limited, and may be [1] a process comprising mixing a previously prepared water-based coating material and an aqueous dispersion containing the above-described polyolefin resin (A) and preferably another resin (B), or [2] a process comprising adding a pigment or a dye to an aqueous dispersion containing the above-described polyolefin resin (A) and preferably another resin (B).

Here, "previously prepared water-based coating material" means a water-based coating material usable as is such as commercially available water-based coating materials, e.g., Aqua series including "Aquaecol JW 224", "Aqua ALB", "Aqua King S" and "Aqua Fronte" available from Toyo Ink Manufacturing Co., Ltd., Marine Plus series including "Marine Plus HR" and DIC safe series including "DIC Safe GK, BAG-C" available from DAINIPPON INK AND CHEMICALS, INC., O-DE ECOLINE series available from NIPPON PAINT Co., Ltd., ALES AQUAGLOSS series available from Kansai Paint Co., Ltd. and G-series available from MEGAMI INK MANUFACTURING Co., Ltd.

In the above-described process [1], mixing may be simply performed in a short time because the aqueous dispersion and the water-based coating material have high mixing dispersibility.

On the other hand, in the process [2], for example, a pigment or a dye and water, and other components such as a pigment dispersant, a thickener or a defoaming agent may be first mixed to prepare a pigment base, and the pigment base is then mixed with an aqueous dispersion containing a polyolefin resin (A) and preferably another resin (B). Alternatively, a pigment or a dye, water, an aqueous dispersion containing a polyolefin resin (A) and another resin (B) may be simultaneously mixed.

In both processes of [1] and [2], a general mixer may be used upon mixing, examples of which include mixers such as a dissolver, a homogenizer and a homomixer, and dispersers such as a paint shaker, a ball mill, a sand mill, an attritor, a roll mill and a kneader.

Further, the solid concentration after mixing may be controlled, for example, by removing aqueous medium or diluting with water to the desired solid concentration and viscosity. In addition, to improve coating properties, an organic solvent such as low boiling point alcohol, e.g., isopropanol, may be added.

Drying of the water-based coating material of the present invention is not particularly limited, and it may be dried in a broad temperature range of 0 to 250° C. When the heat resistance of the substrate is not sufficiently high, drying at about 0 to 200° C. is more practical. Further, the drying time is usually in the range of 5 seconds to 120 minutes, although it depends on the drying temperature and the thickness of the coating film and is not particularly limited. When the drying temperature is 50 to 150° C., a good coating film can be obtained in a drying time of about 5 seconds to 3 minutes, and even at room temperature (about 20° C.), a good coating film can be obtained in a drying time of about 30 minutes to 120 minutes. As described above, since the coating material of the present invention can form a good film even at a relatively low temperature, it contributes to energy conservation in production steps. This is attributable to a fine particle size of a polyolefin resin dispersion of 1 μm or smaller, and is an extremely advantageous industrial effect that has not been achieved in conventional coating materials (those having a dispersion particle size of more than 1 μm).

The water-based coating material of the present invention is excellent in adhesion to various substrates and useful for coating on paper, synthetic paper, thermoplastic resin films, plastic goods and steel plates. In particular, when a thermoplastic resin film is used as a substrate, a laminated film can be advantageously formed by direct lamination. Because of their excellent adhesion, preferable substrate resins are a polyolefin resins, in particular, a polypropylene resin, an acid modified polypropylene resin and an elastomer modified polypropylene resin.

Examples of thermoplastic resin films include films and laminates composed of a thermoplastic resin including polyamide resins such as nylon 6 (hereinafter abbreviated as "Ny6"), nylon 66 and nylon 46, polyester resins such as polyethylene terephthalate (hereinafter abbreviated as "PET"), polyethylene naphthalate, polytrimethylene terephthalate, polytrimethylene naphthalate, polybutylene terephthalate and polybutylene naphthalate, biodegradable resins which are typically polyhydroxy carboxylic acids such as polyglycolic acid and polylactic acid and aliphatic polyester resins such as polyethylene succinate and polybutylene succinate, polyolefin resins such as polypropylene (hereinafter abbreviated as "PP"), modified polypropylene and polyethylene, polyimide resins, polyallylate resins or a mixture thereof. Of these, films composed of polyester, polyamide, polyethylene or polypropylene are preferably used. These substrate films may be either an unstretched film or stretched film, and the production method is not limited. The thickness of the substrate film is not particularly limited, and is usually in the range of 1 to 500 μm. The coated surface of the substrate film may be subjected to corona discharge, or silica or alumina may be deposited thereon.

To improve adhesion to a water-based coating material, it is preferable that an easy-to-adhere layer is previously formed on a thermoplastic resin film and the water-based coating material is applied to the easy-to-adhere layer. Examples of resins constituting the easy-to-adhere layer include polyurethane resins, polyester resins, polyolefin resins and acrylic resins. In particular, acid modified polyolefin resins are preferred because they are excellent in adhesion to both a substrate film and the water-based coating material of the present invention. Of the acid modified polyolefin resins, more preferred are ethylene-(meth)acrylic acid copolymers, ethylene-(meth)acrylic acid-maleic anhydride ternary copolymers (including maleic anhydride graft polymers), resins obtained by modifying an ethylene-propylene copolymer by maleic anhydride or (meth)acrylic acid, resins obtained by modifying a polypropylene-butene copolymer by maleic anhydride or (meth)acrylic acid, and resins obtained by modifying an ethylene-polypropylene-butene copolymer by maleic an hydride or (meth)acrylic acid. The content of an acid component such as maleic anhydride or (meth)acrylic acid is preferably 0.1 to 25% by mass, more preferably 0.5 to 15% by mass, further preferably 0.5 to 10% by mass and particularly preferably 1 to 8% by mass in view of adhesion. The easy-to-adhere layer has a thickness of 0.01 to 10 μm, more preferably 0.05 to 5 μm.

The method of applying the water-based coating material of the present invention to a substrate is not particularly limited, but gravure roll coating, reverse roll coating, wire bar coating, lip coating, air knife coating, curtain flow coating, spray coating, immersion coating and brush coating may be employed. Printing methods include gravure printing, stencil printing, screen printing, offset printing, flexographic printing, thermal transfer printing, inkjet printing, scratch printing, printer slotter printing, pad printing, form printing and label printing.

When a laminate layer is formed on the surface of a film coated with the water-based coating material of the present invention to form a laminate film, the laminate layer is formed by extrusion lamination, dry lamination or direct lamination. In extrusion lamination, a laminate film is obtained by coating a water-based coating material on a substrate film, then applying an imine, isocyanate or titanate anchor coating agent on the coated surface, and laminating molten polyethylene resin or polypropylene resin thereon. In dry lamination, a laminate film is obtained by coating a polyurethane resin adhesive on the coated surface of a substrate film and bonding a thermoplastic resin film thereto. In direct lamination, a laminate film is obtained by coating a water-based coating material on a substrate film and then directly laminating molten polyethylene resin or polypropylene resin on the coated surface, or forming a laminate layer by directly laminating a film composed of polyethylene or polypropylene on the coated surface.

Since the water-based coating material of the present invention is excellent in adhesion to substrates, any of the above laminate forming methods may be used. Among them, direct lamination, which is the most economical, is the most suitable method to the water-based coating material of the present invention for its effective properties in the method.

The polyethylene resin used for a laminate layer may contain an ethylene component as a main component, or may be a binary or multi-component copolymer of an α-olefin such as propylene, 1-butene, 2-butene, 1-hexene, 1-heptene or 4-methyl-1-pentene, vinyl acetate, (meth)acrylic acid and (meth)acrylic ester. Or the resin may be a polyethylene resin modified by acid such as maleic anhydride or a polyethylene resin which has been subjected to oxidation treatment at a high temperature.

Although the polypropylene resin used for a laminate layer has any steric structure, the resin may be a polypropylene resin homopolymer having an isotactic or a syndiotactic structure, or of various stereoregularity. The resin may also be a copolymer of propylene which is the main component and an α-olefin such as ethylene, 1-butene, 2-butene, 1-hexene, 1-heptene or 4-methyl-1-pentene. These copolymers may be a binary or multi-component copolymer, a random copolymer or a block copolymer. The copolymers may also be a polypropylene resin modified by acid such as maleic anhydride or a polypropylene resin which has been subjected to oxidation treatment at a high temperature. These may be used alone or in a mixture of plural kinds.

The coating amount of the water-based coating material of the present invention is appropriately determined based on its use, and the coating amount after drying is preferably 0.01 to 100 g/m², more preferably 0.1 to 50 g/m², and particularly preferably 0.2 to 30 g/m². When a film is formed so that the coating amount is in the range of 0.01 to 100 g/m², a highly homogeneous resin coating film can be obtained.

To control the coating amount, it is preferable to use a water-based coating material having a concentration and a viscosity suitable for the thickness of the intended coated film in addition to appropriating selecting the apparatus for coating and conditions of use thereof. The concentration can be adjusted by the composition of charge upon preparation. The concentration may also be adjusted by diluting or concentrating a water-based coating material once prepared.

EXAMPLE

The present invention will now be described in detail by means of Examples, but the present invention is not limited to these Examples.

The properties described later were measured or evaluated by the following methods.

[Evaluation of Aqueous Polyolefin Resin Dispersion]

(1) Content of Unsaturated Carboxylic Acid Unit

The acid value of polyolefin resin was measured in accordance with JIS K5407 and the content of unsaturated carboxylic acid was calculated from the value.

(2) Composition of Resin Other than Unsaturated Carboxylic Acid Unit

Determined by $^1$H-NMR and $^{13}$C-NMR analyses (using an apparatus made by Varian Inc., 300 MHz) in o-dichlorobenzene ($d_4$) at 120° C.

In $^{13}$C-NMR analyses, measurement was performed by gated decoupling from a quantitative viewpoint.

(3) Weight Average Molecular Weight of Resin

A sample was dissolved in tetrahydrofuran and measurement was performed using a GPC analyzer (made by Tosoh Corporation, HLC-8020, column: TSK-GEL) at 40° C. The weight average molecular weight was determined from a calibration curve obtained using a polystyrene standard sample. When the sample is difficult to dissolve in tetrahydrofuran, o-dichlorobenzene was used.

(4) Solid Concentration of Aqueous Dispersion

An appropriate amount of polyolefin dispersion was weighed and heated at 150° C. until the mass of the remaining substance (solid) became constant to determine the solid concentration of the polyolefin resin.

(5) Number Average Particle Size and Weight Average Particle Size of Polyolefin Resin Particles The number average particle size (mn) and the weight average particle size (mw) were measured using Microtrac particle size analyzer UPA150 (MODEL No. 9340) made by NIKKISO Co., Ltd. The refractive index of the resin was 1.5.

(6) Pot Life

The appearance of an aqueous dispersion allowed to stand at room temperature for 90 days was evaluated based on the following three scales.

○: no change in appearance
Δ: thickening is found
X: solidification, agglomeration or precipitation is found When the appearance evaluation marked "○", the number average particle size was also measured by the above-described method.

(7) Content of Organic Solvent in Aqueous Dispersion

Using Gas Chromatograph GC-8A made by Shimadzu Corporation [FID detector used, carrier gas: nitrogen, filler material of column (available from GL Sciences Inc.): PEG-HT (5%)-Uniport HP (60/80 mesh), column size: diameter 3 mm×3 m, temperature upon introduction of sample (injection temperature): 180° C., column temperature: 80° C., internal standard material: n-butanol], an aqueous dispersion diluted with water when necessary was directly introduced into the apparatus to determine the content of the organic solvent. The detection limit was 0.01% by mass.

(8) Water Resistance of Coating Film

An aqueous dispersion was applied to an untreated surface of a stretched polypropylene (PP) film (OP U-1 available from TOHCELLO CO., LTD, thickness 20 μm) using a Meyer bar so that the coating amount after drying was about 2 g/m², and the coated dispersion was dried at 100° C. for 2 minutes. The coated PP film prepared in this manner was immersed in warm water at 40° C. for 1 day and the coated surface was visually observed.

○: no change in appearance
Δ: coating film becomes white
X: coating layer is dissolved or peeled off (9) Evaluation of Adhesion of Coating Film An aqueous dispersion was applied to an untreated surface of a stretched polypropylene (PP) film (OP U-1 available from TOHCELLO CO., LTD, thickness 20 μm), a biaxially stretched polyethylene terephthalate (PET) film (Emblet PET12 available from UNITIKA LTD., thickness 12 μm), and a biaxially stretched nylon 6 (Ny6) film (Emblem available from UNITIKA LTD., thickness 15 μm) using a Meyer bar so that the coating amount after drying was about 2 g/m², and the coated dispersion was dried at 100° C. for 2 minutes. An adhesive tape (TF-12 available from NICHIBAN CO., LTD.) was adhered to the coated surface and stripped off. The coated film surface was visually observed and evaluated as follows.

○: not peeled off at all
Δ: partially peeled off
X: entirely peeled off

(10) Evaluation of Heat Seal Strength

A coating solution containing an aqueous dispersion was applied to an untreated surface of a stretched PP film (OP U-1 available from TOHCELLO CO., LTD, thickness 20 μm), aluminum foil (available from MITSUBISHI ALUMINUM CO., LTD. thickness 15 μm), A4 size woodfree paper (available from Daishowa Paper Manufacturing Co., Ltd.) using a Meyer bar so that the coating amount after drying was about 5 g/m², and the coated dispersion was dried at 100° C. for 2 minutes. Then, another PP film was contacted to the coated surface of the above-described stretched PP film, another PP film was contacted to the coated surface of the aluminum foil, and another PP film was contacted to the coated surface of the woodfree paper, respectively, and each was pressed using a heat press at a sealing pressure of 3 kg/cm² and a sealing temperature of 110° C. for 5 seconds to give samples. These samples were cut in a width of 15 mm, and after 1 day of the pressing operation, the peeling strength of the coated film was measured using a tensile tester (Precision Universal Material Tester 2020 type made by INTESCO Co., Ltd.) at a tensile speed of 200 mm/minute and a tensile angle of 180 degrees to evaluate the heat seal strength.

(11) Evaluation of Heat Seal Strength After Long Storage

A sample of heat sealed PP films prepared by the method described in the above (10) was cut in a width of 15 mm, and stored under conditions of 40° C. and 90% RH for 30 days. Then, the peeling strength of the coated film was measured using a tensile tester (Precision Universal Material Tester 2020 type made by INTESCO Co., Ltd.) at a tensile speed of 200 mm/minute and a tensile angle of 180 degrees to evaluate the heat seal strength after storage.

[Evaluation of Water-based Coating Material]

(1) Concentration (% By Mass) of Resin Component and Pigment Component in Commercially Available Coating Material An appropriate amount of a commercially available coating material was weighed and heated at 150° C. until the mass of the remaining substance (solid) became constant to determine the mass of the remaining substance. The remaining substance was stirred in toluene at 70° C. for 2 hours, and the mass after filtration of insoluble matters and drying was determined to be a pigment component mass, and the pigment component concentration was calculated.

The mass obtained by subtracting the weight of the pigment component from the mass of the remaining substance was defined as a resin component mass of the commercial coating material, and the resin component concentration of the commercial coating material was calculated.

(2) Pot Life

The appearance of a prepared coating material allowed to stand at room temperature for 90 days was evaluated based on the following three scales.

○: no change in appearance

Δ: thickening was found

X: solidification and agglomeration was found

In the following evaluations (3) to (6), Emblet PET12 available from UNITIKA LTD. was used as biaxially stretched PET film (thickness 12 μm), Emblem (thickness 15 μm) available from UNITIKA LTD. was used as biaxially stretched Ny 6 film, and OP U-1 (thickness 20 μm) available from TOHCELLO CO., LTD. was used as a stretched PP film.

(3) Evaluation of Water Resistance

A prepared water-based coating material was applied to the corona treated surface of a biaxially stretched PET film by a gravure proof press and dried at 80° C. The obtained film was allowed to stand at room temperature for 1 day. Then, the coated surface of the film was rubbed several times with a cloth wetted with water, and the coated surface was visually observed and evaluated as follows.

○: no change in appearance

Δ: coated surface was dull

X: coating material on the coated surface was completely dissolved (4) Evaluation of Adhesion (I)

A water-based coating material was applied to a high rigidity polypropylene plate (thickness 1 cm) of which the surface was washed with ethanol using a bar coater so that the coated film thickness after drying was 5 μm, and dried at 50° C. and 80° C. each for 5 minutes. The adhesion of the coating film was evaluated in accordance with JIS K5400 8.5.2. A cross cut area of 1 mm×1 mm×100 pieces was subjected to peeling using an adhesive tape (TF-12 available from NICHIBAN CO., LTD.), and evaluated based on the number of remaining pieces that has not been peeled off. In the following, "n/100" indicates that n pieces of 100 cross cuts were not peeled off and remained.

(5) Evaluation of Adhesion (II)

A prepared coating material was applied to the non-corona treated surface of a substrate film using a gravure proof press and dried at 80° C. for 30 seconds and at room temperature (20° C.) for 120 minutes. Then, an adhesive tape (TF-12 available from NICHIBAN CO., LTD.) was adhered to the coated surface and stripped off. The coated film surface was visually observed and evaluated as follows.

○: not peeled off at all

Δ: partially peeled off

X: entirely peeled off (6) Direct Lamination Strength

A biaxially stretched Ny6 film was used as a substrate film and a prepared coating material was applied to the corona-treated surface of the substrate film using a gravure proof press and dried. Subsequently, a molten PE resin (Sumikasen L211 available from Sumitomo Chemical Co., Ltd.,) or a PP resin (propylene homopolymer, melt flow rate 4 g/10 minutes, melting point 164° C.) whose temperature was 300° C. was laminated on the coated surface of the film using an extruder (VE-40 made by Tanabe Plastics Machinery Co., Ltd.) in a thickness of 50 μm to prepare a laminate film. A test piece was cut from the laminate film in a width of 15 mm, and 1 day after the film was prepared, the peeling strength between the laminate film and the coated surface was measured using a tensile tester (INTESCO Precision Universal Material Tester 2020 type made by INTESCO Co., Ltd.) at a tensile speed of 200 mm/minute and a tensile angle of 180 degrees to evaluate the direct lamination strength (mN/15 mm). (Production of polyolefin resin "P-1")

280 g of a propylene-butene-ethylene ternary copolymer (available from Hüls Japan Co., Ltd., Bestplast 708, propylene/butene/ethylene=64.8/23.9/11.3% by mass) was heated and melted in a four-neck flask under nitrogen atmosphere. Then, with maintaining the temperature of the system at 170° C., 32.0 g of maleic anhydride as unsaturated carboxylic acid and 6.0 g of dicumyl peroxide as a radical generator were each added thereto over 1 hour under stirring, and the mixture was allowed to react for an hour. After completion of the reaction, the obtained reaction product was introduced into a large amount of acetone to precipitate the resin. Further, after washing the resin with acetone for several times to remove unreacted maleic anhydride, the resultant was dried under reduced pressure using a vacuum dryer to give polyolefin resin "P-1". The properties of the obtained resin are shown in Table 1.

(Production of Polyolefin Resin "P-2")

A propylene-butene-ethylene ternary copolymer (available from Hüls Japan Co., Ltd., Bestplast 408, propylene/butene/ethylene=12.3/82.2/5.5% by mass) was used. Except for that, polyolefin resin "P-2" was prepared in the same manner as in Example 1. The properties of the obtained resin are shown in Table 1.

(Production of Polyolefin Resin "P-3")

280 g of a propylene-ethylene copolymer (propylene/ethylene=81.8/18.2% by mass, weight average molecular weight 85,000) was heated and melted in a four-neck flask under nitrogen atmosphere. Then, with maintaining the temperature of the system at 180° C., 35.0 g of maleic anhydride as unsaturated carboxylic acid and 6.0 g of di-t-butyl peroxide as a radical generator were each added thereto over 2 hours under stirring, and the mixture was allowed to react for 1 hour. After completion of the reaction, the obtained reaction product was introduced into a large amount of acetone to precipitate the resin. Further, after washing the resin with acetone for several times to remove unreacted maleic anhydride, the resultant was dried under reduced pressure using a vacuum dryer to give polyolefin resin "P-3". The properties of the obtained resin are shown in Table 1.

(Production of Polyolefin Resin "P-4")

100 g of a propylene-butene-ethylene ternary copolymer (available from Hüls Japan Co., Ltd., Bestplast 708, propylene/butene/ethylene=64.8/23.9/11.3% by mass) and 500 g of toluene were heated and melted in a four-neck flask equipped with a stirrer, a condenser tube and a dropping funnel under nitrogen atmosphere. Then, with maintaining the temperature of the system at 110° C., 20 g of a 1.0 g dicumyl peroxide heptane solution was added thereto as a radical generator over 1 hour under stirring. Subsequently, 7.0 g of maleic anhydride as unsaturated carboxylic acid, 10.0 g of lauryl acrylate, 10 g of a 0.5 g dicumyl peroxide heptane solution were each added thereto dropwise over 1 hour, and the mixture was allowed to react for 30 minutes. After completion of the reaction, the system was cooled to room temperature and the obtained reaction product was introduced into a large amount of acetone to precipitate the resin. Further, after washing the resin with acetone for several times to remove unreacted product, the resultant was dried under reduced pressure using a vacuum dryer to give polyolefin resin "P-4". The properties of the obtained resin are shown in Table 1.

performed at a rotational speed of the stirring blade of 300 rpm, and it was confirmed that the resin was not precipitated at the bottom of the container but was in a suspension state. Thus, the system was maintained as it is, and after 10 minutes, the power of the heater was turned on for heating. The temperature of the system was maintained at 140° C. and the system was stirred for 60 minutes. After that, the system was air cooled to room temperature (about 25° C.) with maintaining the rotational speed of 300 rpm. Then, filtration was performed under pressure (air pressure 0.2 MPa) using a 300 mesh stainless steel filter (wire diameter 0.035 mm, plain weave) to give uniform opaque yellow aqueous polyolefin resin dispersion "E-1". There was little resin remaining on the filter. The properties of the aqueous dispersion and the film properties are shown in Table 2.

Examples 2 to 4

The kind and amount of organic solvent and the kind of basic compound to be added were changed as shown in Table 2. Except for that, aqueous dispersions "E-2" to "E-4" were prepared in the same manner as in Example 1. The properties of the obtained aqueous dispersions and film properties are shown in Table 2. Here, isopropanol (available from Wako Pure Chemical Industries, Ltd., Special Grade) and n-butanol (available from Wako Pure Chemical Industries, Ltd., Special Grade) used as organic solvents had a boiling point of 82° C. and 118° C., respectively. Triethylamine used as a basic compound (available from Wako Pure Chemical Industries, Ltd., Special Grade) had a boiling point of 90° C.

Examples 5 and 6

As polyolefin resins, "P-2" (Example 5) and "P-3" (Example 6) were used. Except for that, aqueous dispersions "E-5" and "E-6" were prepared in the same manner as in Example 1. The properties of the obtained aqueous dispersion and the film properties are shown in Table 2.

Example 7

A stirrer equipped with a 1 L hermetically sealable pressure glass container with a heater was used. The glass container was charged with 60.0 g of polyolefin resin "P-4", 90.0 g of n-propanol (available from Wako Pure Chemical Indus-

TABLE 1

| Polyolefin resin | Composition (% by mass) | | | | | Weight average molecular weight |
|---|---|---|---|---|---|---|
| | Propylene | Butene | Ethylene | Acrylic ester | Maleic anhydride | |
| P-1 | 60.7 | 22.4 | 10.6 | 0 | 6.3 | 40,000 |
| P-2 | 11.5 | 77.3 | 5.2 | 0 | 6.0 | 55,000 |
| P-3 | 75.4 | 0 | 16.8 | 0 | 7.8 | 38,000 |
| P-4 | 57.9 | 21.3 | 10.1 | 6.5 | 4.2 | 50,000 |

Example 1

A stirrer equipped with a 1 L hermetically sealable pressure glass container with a heater was used. The glass container was charged with 60.0 g of polyolefin resin "P-1", 45.0 g of an ethylene glycol-n-butyl ether (available from Wako Pure Chemical Industries, Ltd., Special Grade, boiling point 171° C.), 6.9 g of N,N-dimethylethanolamine (available from Wako Pure Chemical Industries, Ltd., Special Grade, boiling point 134° C.) and 188.1 g of distilled water. Stirring was tries, Ltd., Special Grade, boiling point 97° C.), 6.2 g of triethylamine (available from Wako Pure Chemical Industries, Ltd., Special Grade, boiling point 89° C.) and 143.8 g of distilled water. Stirring was performed at a rotational speed of the stirring blade of 300 rpm, and it was confirmed that the resin was not precipitated at the bottom of the container but was in a suspension state. Thus, the system was maintained as it is, and after 10 minutes, the power of the heater was turned on for heating. The temperature of the system was maintained at 140° C. and the system was stirred for 60 minutes. After that, the system was air cooled to room temperature (about 25° C.) with maintaining the rotational speed of 300 rpm. Then, filtration was performed under pressure (air pressure 0.2 MPa) using a 300 mesh stainless steel filter (wire diameter 0.035 mm, plain weave) to give uniform opaque yellow aqueous polyolefin resin dispersion "E-7". The properties of the aqueous dispersion and the film properties are shown in Table 2.

Example 8

Aqueous polyolefin resin dispersions "E-1" and "E-5" were mixed so that the mass ratio of the solids was 75/25, and stirred to give aqueous dispersion "E-8". The properties of the aqueous dispersion and the film properties are shown in Table 2.

Example 9

A 0.5 L two-neck round flask was charged with 250 g of "E-1" obtained in Example 1 and 90 g of distilled water. A mechanical stirrer and a Liebig condenser were attached thereto and the flask was heated in an oil bath to remove the aqueous medium. When about 90 g of the aqueous medium was removed, heating was stopped and the flask was cooled to room temperature. After cooling, the liquid component in the flask was subjected to filtration under pressure (air pressure 0.2 MPa) using a 300 mesh stainless steel filter (wire diameter 0.035 mm, plain weave) to give uniform white aqueous polyolefin resin dispersion "E-9". The properties of the obtained aqueous dispersion and the film properties are shown in Table 2. The content of the organic solvent in the aqueous dispersion was 2.5% by mass.

Comparative Example 1

NUCREL N1050H (available from DU-PONT MITSUI POLYCHEMICALS CO., LTD., ethylene-methacrylic acid copolymer, methacrylic acid content 10% by mass, hereinafter "P-5") was used as a polyolefin resin. Except for that, an aqueous dispersion was prepared in the same manner as in Example 1. Since this aqueous dispersion was thickened after cooling, the dispersion was diluted with water to a solid concentration of 10% by mass and filtrated using a filter to give aqueous dispersion "H-1". The properties of the obtained aqueous dispersion and the film properties are shown in Table 2.

Comparative Example 2

Instead of ethylene glycol-n-butyl ether in Example 1, a non-volatile water-compatibilizing agent NOIGEN EA-190D (available from DAI-ICHI KOGYO SEIYAKU CO., LTD., nonionic surfactant) was added in a proportion of 7 parts by mass based on 100 parts by mass of the solid component of the resin. Although an aqueous dispersion of the resin was to be prepared in the same manner as in Example 1 except for the above, there was little progress in the preparation of resin aqueous dispersion, and a large amount of the resin remained on the filter. In other words, preparation of resin aqueous dispersion was practically impossible by adding NOIGEN EA-190D alone. Thus, as shown in Table 2, ethylene glycol-n-butyl ether (15% by mass/total of aqueous dispersion) and NOIGEN EA-190D (7 parts by mass/100 parts by mass of the solid component of the resin) were used together to prepare an aqueous dispersion of the resin in the same manner as in Example 1, and an aqueous dispersion "H-2" was obtained. The properties of the obtained aqueous dispersion and the film properties are shown in Table 2.

Comparative Example 3

1,4-butanediol (available from Wako Pure Chemical Industries, Ltd., Special Grade, boiling point 224° C.) was used instead of ethylene glycol-n-butyl ether. Although an aqueous dispersion of the resin was to be prepared in the same manner as in Example 1 except for the above, there was little progress in the preparation of resin aqueous dispersion, and a large amount of the resin remained on the filter. In other words, preparation of resin aqueous dispersion was practically impossible by adding 1,4-butanediol alone. Thus, 1,4-butanediol was added thereto so that the proportion thereof was 15% by mass based on the total mass of liquid "E-1" obtained in Example 1 to give an aqueous dispersion "H-3". The properties of the obtained aqueous dispersion and the film properties are shown in Table 2.

Comparative Example 4

1,2-propanediol (available from Wako Pure Chemical Industries, Ltd., Special Grade, boiling point 187° C.) was used instead of ethylene glycol-n-butyl ether. Although an aqueous dispersion of the resin was to be prepared in the same manner as in Example 1 except for the above, there was little progress in the preparation of resin aqueous dispersion, and a large amount of the resin remained on the filter. In other words, preparation of resin aqueous dispersion was practically impossible by adding 1,2-propanediol alone. Thus, 1,2-propanediol was added thereto so that the proportion thereof was 15% by mass based on the total of liquid "E-1" obtained in Example 1 to give an aqueous dispersion "H-4". The properties of the obtained aqueous dispersion and the film properties are shown in Table 2.

TABLE 2

| | | | Ex. 1 | Ex. 2 | Ex. 3 | Ex. 4 | Ex. 5 | Ex. 6 | Ex. 7 |
|---|---|---|---|---|---|---|---|---|---|
| | Aqueous dispersion | | E-1 | E-2 | E-3 | E-4 | E-5 | E-6 | E-7 |
| Charged materials | Polyolefin resin | | P-1 | P-1 | P-1 | P-1 | P-2 | P-3 | P-4 |
| | Basic compound | | DMEA | TEA | DMEA | DMEA | DMEA | DMEA | TEA |
| | Organic solvent (% by mass) | Bu-EG | 15 | 10 | — | — | 15 | 15 | — |
| | | BuOH | — | — | 25 | — | — | — | — |
| | | IPA | — | — | — | 45 | — | — | — |
| | | NPA | — | — | — | — | — | — | 30 |
| | Surfactant | Kind | — | — | — | — | — | — | — |
| | | Amount (Parts by mass/100 parts by mass of resin solid component) | 0 | 0 | 0 | 0 | 0 | 0 | 0 |

TABLE 2-continued

| Properties of dispersion | Solid component (% by mass) | | 20.1 | 20.0 | 19.9 | 19.5 | 20.0 | 20.0 | 19.9 |
|---|---|---|---|---|---|---|---|---|---|
| | Particle size (μm) | Mn | 0.082 | 0.120 | 0.156 | 0.257 | 0.090 | 0.095 | 0.083 |
| | | Mw | 0.185 | 0.489 | 0.766 | 1.035 | 0.218 | 0.286 | 0.294 |
| | Pot life | Appearance | ○ | ○ | ○ | ○ | ○ | ○ | ○ |
| | | Mn | 0.085 | 0.098 | 0.160 | 0.275 | 0.090 | 0.095 | 0.088 |
| | Organic solvent content (% by mass) | | 15 | 10 | 25 | 45 | 15 | 15 | 30 |
| Adhesion | Water resistance | | ○ | ○ | ○ | ○ | ○ | ○ | ○ |
| | PP | | ○ | ○ | ○ | ○ | ○ | ○ | ○ |
| | PET | | ○ | ○ | ○ | ○ | ○ | ○ | ○ |
| | Ny6 | | ○ | ○ | ○ | ○ | ○ | ○ | ○ |
| Heat seal strength (N/15 mm) | PP/PP[1] | | 5.8 | 5.5 | 5.6 | 5.5 | 8.5 | 4.5 | 7.6 |
| | PP/Al[2] | | 5.5 | 5.4 | 5.2 | 5.3 | 7.5 | 4.5 | 7.9 |
| | PP/paper[3] | | substrate broken | substrate broken | substrate broken | substrate broken | substrate broken | substrate broken | substrate broken |
| Long term heat seal strength (N/15 mm) | | | 5.8 | 5.4 | 5.6 | 5.5 | 8.3 | 4.4 | 8.5 |

| | | | Ex. 8 | Ex. 9 | Com. Ex. 1 | Com. Ex. 2 | Com. Ex. 3 | Com. Ex. 4 |
|---|---|---|---|---|---|---|---|---|
| Charged materials | Aqueous dispersion | | E-8 | E-9 | H-1 | H-2 | H-3 | H-4 |
| | Polyolefin resin | | P-1, P-2 | P-1 | P-1 | P-5 | P-1 | P-1 |
| | Basic compound | | E-1 and E-5 mixed (75/25 in solid mass ratio) | DMEA | DMEA | DMEA | E-1 mixed with 1,4-butane-diol | E-1 mixed with 1,2-propane-diol |
| | Organic solvent (% by mass) | Bu-EG | | 15 | 15 | 15 | | |
| | | BuOH | | — | — | — | | |
| | | IPA | | — | — | — | | |
| | | NPA | | — | — | — | | |
| | Surfactant | Kind | | | | EA-190D | | |
| | | Amount (Parts by mass/100 parts by mass of resin solid component) | | 0 | 0 | 7 | | |
| Properties of dispersion | Solid component (% by mass) | | 20.0 | 20.8 | 10.0 | 21.2 | 17.0 | 17.0 |
| | Particle size (μm) | Mn | 0.084 | 0.088 | 0.155 | 0.080 | 0.085 | 0.086 |
| | | Mw | 0.266 | 0.195 | 0.860 | 0.170 | 0.188 | 0.180 |
| | Pot life | Appearance | ○ | ○ | ○ | ○ | ○ | ○ |
| | | Mn | 0.088 | 0.090 | — | 0.080 | 0.087 | 0.087 |
| | Organic solvent content (% by mass) | | 15 | 2.5 | 7.5 | 15 | 27.8 | 27.8 |
| Adhesion | Water resistance | | ○ | ○ | ○ | X | Δ | Δ |
| | PP | | ○ | ○ | X | Δ | Δ | Δ |
| | PET | | ○ | ○ | X | Δ | Δ | Δ |
| | Ny6 | | ○ | ○ | X | Δ | Δ | Δ |
| Heat seal strength (N/15 mm) | PP/PP[1] | | 7.2 | 7.2 | 0.4 | 3.6 | 4.2 | 4.4 |
| | PP/Al[2] | | 6.0 | 6.0 | 0.5 | 3.5 | 4.0 | 4.1 |
| | PP/paper[3] | | substrate broken | substrate broken | substrate broken | substrate broken | substrate broken | substrate broken |
| Long term heat seal strength (N/15 mm) | | | 7.0 | 5.3 | 0.3 | 1.2 | 1.8 | 2.0 |

[1]Stretched polypropylene/stretched propylene
[2]Stretched polypropylene/aluminum foil
[3]Stretched polypropylene/woodfree paper
Basic compound: DMEA: N,N-dimethylethanolamine, TEA: triethylamine
Organic solvent: Bu-EG: ethylene glycol-n-butyl ether, BuOH: n-butanol, IPA: isopropanol, NPA: n-propanol Surfactant: EA-190D: NOI-GEN EA-190D Example 10

The aqueous polyolefin resin dispersion "E-1" obtained in Example 1 and an aqueous dispersion of another polymer were mixed. A polyurethane aqueous dispersion (ADEKA BONTITER HUX-380, available from ASAHI DENKA Co., Ltd.) was used as the aqueous dispersion of another polymer.

More specifically, "E-1" was first stirred and the above-described aqueous dispersion was added thereto in an amount of 50 parts by mass on a solid basis relative to 100 parts by mass of the solid component of "E-1", and the mixture was stirred at room temperature for 30 minutes (the resultant is referred to as "M-1"). The evaluation result of the adhesion of the coating film obtained from this liquid is shown in Table 3.

Examples 11 to 13

The aqueous polyolefin resin dispersion "E-1" obtained in Example 1 and a crosslinking agent were mixed. A melamine compound (Cymel 327, available from Mitsui Cytec, Ltd., Example 11), an isocyanate compound (Bayhydur 3100, available from Sumika Bayer Urethane Co., Ltd., Example 12), and an oxazoline group-containing compound (EPOCROS WS-700, available from NIPPON SHOKUBAI Co., Ltd., Example 13) were used as crosslinking agents.

More specifically, "E-1" was first stirred and the crosslinking agent was added thereto in an amount on a solid basis shown in Table 3 based on 100 parts by mass of the solid component of "E-1", and the mixture was stirred at room temperature for 10 minutes (the resultant is referred to as "M-2" to "M-4"). The evaluation results of the adhesion of the coating films obtained from these liquids are shown in Table 3.

Example 14

An aqueous dispersion containing carbon black as a pigment (LION PASTE W-376R, available from Lion Corporation) was added to the aqueous polyolefin resin dispersion "E-1" obtained in Example 1 in an amount of 80 parts by mass on a solid basis relative to 100 parts by mass of the solid component of "E-1", and the mixture was subjected to propeller stirring to prepare a water-based coating material "M-5". The evaluation result of the adhesion of the coating film obtained from this liquid is shown in Table 3.

TABLE 3

|  |  | Ex. 10 | Ex. 11 | Ex. 12 | Ex. 13 | Ex. 14 |
|---|---|---|---|---|---|---|
| Coat solution | | M-1 | M-2 | M-3 | M-4 | M-5 |
| Aqueous polyolefin resin dispersion | | E-1 | E-1 | E-1 | E-1 | E-1 |
| Additive | Kind | HUX-380 | Cymel 327 | Bayhydur 3100 | WS-700 | W-376R |
| | Amount (part by mass) | 50 | 10 | 10 | 15 | 80 |
| Adhesion | PP | ○ | ○ | ○ | ○ | ○ |
| | PET | ○ | ○ | ○ | ○ | ○ |
| | Ny6 | ○ | ○ | ○ | ○ | ○ |

Additives: HUX-380: aqueous polyurethane resin dispersion, Cymel 327: melamine resin, Bayhydur 3100: isocyanate compound, WS-700: oxazoline group-containing compound, W-376R: carbon black dispersion In Examples 1 to 9, fine and stable aqueous dispersions having a number average particle size of polyolefin resin of 1 μm or smaller were obtained without adding a non-volatile water-compatibilizing agent such as surfactant or a water-compatibilizing agent having a high boiling point (e.g., boiling point of 185° C. or higher). The coating films obtained from these aqueous dispersions were excellent in water resistance, adhesion and heat sealing properties even under drying conditions of relatively low temperatures and short time. In addition, since the coating film does not contain a surfactant or the like, there was little change in the heat sealing properties even after long storage. Further, even when an aqueous dispersion of another resin, a crosslinking agent or a pigment is added (Examples 10 to 14), properties such as adhesion were not deteriorated and were excellent.

On the contrary, in Comparative Example 1, since the composition of the polyolefin resin was different from that of the present invention, the adhesion and the heat sealing properties to PP and others were poor. In Comparative Examples 2 to 4, surfactants (non-volatile water-compatibilizing agent) or high boiling point polyol (1,4-butanediol (boiling point 224° C.), 1,2-propanediol (boiling point 187° C.)) used in conventional methods were added, and the water resistance, adhesion and heat sealing properties of the coating film obtained therefrom were significantly decreased compared to those of Examples. In particular, the heat sealing properties after long storage were significantly deteriorated. Further, preparation of resin aqueous dispersion was practically difficult by adding polyol alone (Comparative Examples 3, 4).

Reference Example 1

(Preparation of Polyolefin Resin Dispersion "S-1")

Aqueous dispersion S-1 was prepared using ethylene glycol-n-butyl ether of Example 1 in a smaller amount (8% by mass of the aqueous dispersion). This made the number average particle size and the weight average particle size of the polyolefin resin larger than 1 μm, which are each 1.22 μm and 1.98 μm.

Reference Example 2

(Preparation of Polyolefin Resin Dispersion "S-2")

BONDINE HX8290 (available from Sumitomo Chemical Co., Ltd., ethylene-ethyl acrylate-maleic anhydride copolymer, maleic anhydride content 2 to 3% by mass) "P-6" was used as a polyolefin resin. Except for that, aqueous dispersion "S-2" was prepared in the same manner as in Example 1.

Example 15

Polyolefin resin dispersion "E-1" and an acrylic resin water-based coating material (Aquaecol JW224 available from Toyo Ink Manufacturing Co., Ltd.) were blended so that the solid mass ratio of the resins was 50/50, and mixed by a paint shaker to prepare coating material "J-1". The obtained coating material "J-1" was applied to various substrate films and dried, and the water resistance, adhesion and direct lamination suitability were evaluated. The results are shown in Table 4.

Examples 16, 17

Polyolefin resin dispersions "E-5" and "E-6" were used. Coating materials "J-2" (Example 16) and "J-3" (Example 17) were prepared in the same manner as in Example 15 except for that, and their properties were evaluated. The results are shown in Table 4.

Examples 18, 19

The solid mass ratio of the resins of the polyolefin resin dispersion "E-1" and an acrylic resin water-based coating material (Aquaecol JW224 available from Toyo Ink Manufacturing Co., Ltd.) was adjusted to 75/25 and 20/80. Coating materials "J-4" (Example 18) and "J-5" (Example 19) were prepared in the same manner as in Example 15 except for that, and their properties were evaluated. The results are shown in Table 4.

Example 20

60 parts by mass of titanium oxide as a pigment (Tipaque CR-50 available from ISHIHARA SANGYO KAISHA, LTD.), 0.5 part by mass of thickener (hydroxyethyl cellulose available from Nacalai Tesque, Inc.), 1 part by mass of dispersant (SN Dispersant 5468 available from SAN NOPCO LIMITED) and 38.5 parts by mass of distilled water were blended and mixed until homogeneous using a homomixer. Then, the pigment was dispersed using a paint shaker to give a pigment base. Thereto was added 200 parts by mass of the polyolefin resin dispersion "E-1", followed by mixing by the paint shaker to prepare coating material "J-6", and the properties were evaluated. The results are shown in Table 4.

Example 21

The coating material "J-6" obtained in Example 20 and a polyurethane aqueous dispersion (HYDRAN available from DAINIPPON INK AND CHEMICALS, INC.) were mixed by a paint shaker so that the solid mass ratio of the resins was 70/30 to prepare coating material "J-7", and the properties were evaluated. The results are shown in Table 4.

Example 22

The coating material "J-6" obtained in Example 20 and an aqueous polyester dispersion (KA-5034 available from UNITIKA LTD.) were mixed by a paint shaker so that the solid mass ratio of the resins was 70/30 to prepare coating material "J-8", and the properties were evaluated. The results are shown in Table 4.

Example 23

A polyfunctional isocyanate compound (Bayhydur 3100 available from Sumika Bayer Urethane Co., Ltd., isocyanate group content about 17% by mass) was added to the coating material "J-1" obtained in Example 15 as a crosslinking agent so that the solid component was 3 parts by mass based on 100 parts by mass of the resin of "J-1", and they were mixed by a paint shaker to prepare water-based coating material "J-9", and the properties were evaluated. The results are shown in Table 4.

Example 24

A melamine resin (Cymel 327 available from Mitsui Cytec Ltd.,) was added to the coating material "J-7" obtained in Example 21 as a crosslinking agent so that the solid component was 5 parts by mass based on 100 parts by mass of the resin of "J-7", and they were mixed by a paint shaker to prepare water-based coating material "J-10", and the properties were evaluated. The results are shown in Table 4.

TABLE 4

| | | | Ex. 15 | | Ex. 16 | | Ex. 17 | | Ex. 18 | | Ex. 19 | | Ex. 20 | | Ex. 21 | | Ex. 22 | | Ex. 23 | | Ex. 24 | |
|---|---|---|---|---|---|---|---|---|---|---|---|---|---|---|---|---|---|---|---|---|---|---|
| Properties of dispersion | Kind | | E-1 | | E-5 | | E-6 | | E-1 | | E-1 | | E-1 | | E-1 | | E-1 | | E-1 | | E-1 | |
| | particle size (μm) | mn | 0.062 | | 0.060 | | 0.085 | | 0.062 | | 0.062 | | 0.062 | | 0.062 | | 0.062 | | 0.062 | | 0.062 | |
| | | mw | 0.098 | | 0.085 | | 0.215 | | 0.098 | | 0.098 | | 0.098 | | 0.098 | | 0.098 | | 0.098 | | 0.098 | |
| Properties of water-based coating material | Kind | | J-1 | | J-2 | | J-3 | | J-4 | | J-5 | | J-6 | | J-7 | | J-8 | | J-9 | | J-10 | |
| | Polyolefin resin (A) | | P-1 | | P-2 | | P-3 | | P-1 | | P-1 | | P-1 | | P-1 | | P-1 | | P-1 | | P-1 | |
| | Another resin (B) | | Acrylic resin | | Acrylic resin | | Acrylic resin | | Acrylic resin | | Acrylic resin | | — | | Polyurethane | | Polyester | | Acrylic resin | | Polyurethane | |
| | (A)/(B) (mass ratio) | | 50/50 | | 50/50 | | 50/50 | | 75/25 | | 20/80 | | 100/0 | | 70/30 | | 70/30 | | 50/50 | | 70/30 | |
| | Pigment or dye (C)[1] (parts by mass) | | 200 | | 200 | | 200 | | 100 | | 320 | | 150 | | 105 | | 105 | | 200 | | 105 | |
| | Cross-linking agent (parts by mass/100 parts by mass of resin) | | — | | — | | — | | — | | — | | — | | — | | — | | Isocyanate 3 | | Melamine 5 | |
| | Pot life | | ◯ | | ◯ | | ◯ | | ◯ | | ◯ | | ◯ | | ◯ | | ◯ | | ◯ | | ◯ | |
| | Water resistance | | ◯ | | ◯ | | ◯ | | ◯ | | ◯ | | ◯ | | ◯ | | ◯ | | ◯ | | ◯ | |
| | Adhesion (I) | 50° C. | 100/100 | | 100/100 | | 80/100 | | 100/100 | | 60/100 | | 100/100 | | 100/100 | | 100/100 | | 100/100 | | 100/100 | |
| | | 80° C. | 100/100 | | 100/100 | | 100/100 | | 100/100 | | 90/100 | | 100/100 | | 100/100 | | 100/100 | | 100/100 | | 100/100 | |
| | Adhesion (II) | Temperature | 80° C. | RT[2] | 80° C. | RT[2] | 80° C. | RT[2] | 80° C. | RT[2] | 80° C. | RT[2] | 80° C. | RT[2] | 80° C. | RT[2] | 80° C. | RT[2] | 80° C. | RT[2] | 80° C. | RT[2] |
| | | PET | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | | Ny6 | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | | PP | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ | ◯ |
| | Direct lamination | PE | 2895 | | 2950 | | 1870 | | 3250 | | 1315 | | 2685 | | 3220 | | 3100 | | 2550 | | 2870 | |
| | | PP | 2910 | | 3005 | | 1915 | | 3290 | | 1530 | | 2700 | | 3400 | | 3150 | | 2620 | | 2890 | |

TABLE 4-continued strength (mN/15 mm)

| | | | Com. Ex. 5 | | Com. Ex. 6 | | Com. Ex. 7 | | Com. Ex. 8 | |
|---|---|---|---|---|---|---|---|---|---|---|
| Properties of dispersion | Kind | | E-1 | | S-1 | | H-1 | | S-2 | |
| | particle size ($\mu$m) | mn | 0.062 | | 1.22 | | 0.155 | | 0.068 | |
| | | mw | 0.098 | | 1.98 | | 0.860 | | 0.089 | |
| Properties of water-based coating material | Kind | | H-5 | | H-6 | | H-7 | | H-8 | |
| | Polyolefin resin (A) | | P-1 | | P-1 | | P-5 | | P-6 | |
| | Another resin (B) | | Acrylic resin | | Acrylic resin | | Acrylic resin | | Acrylic resin | |
| | (A)/(B) (mass ratio) | | 5/95 | | 50/50 | | 50/50 | | 50/50 | |
| | Pigment or dye (C)[1] (parts by mass) | | 380 | | 200 | | 200 | | 200 | |
| | Cross-linking agent (parts by mass/100 parts by mass of resin) | | — | | — | | — | | — | |
| | Pot life | | ○ | | ○ | | ○ | | ○ | |
| | Water resistance | | ○ | | ○ | | ○ | | ○ | |
| | Adhesion (I) | 50° C. | 0/100 | | 0/100 | | 0/100 | | 0/100 | |
| | | 80° C. | 0/100 | | 30/100 | | 0/100 | | 0/100 | |
| | Adhesion (II) | Temperature | 80° C. | RT[2] | 80° C. | RT[2] | 80° C. | RT[2] | 80° C. | RT[2] |
| | | PET | Δ | X | ○ | X | X | X | ○ | ○ |
| | | Ny6 | ○ | Δ | ○ | X | X | X | ○ | ○ |
| | | PP | X | X | X | X | X | X | Δ | X |
| | Direct lamination strength (mN/15 mm) | PE | 0 | | 1210 | | 10 | | 3200 | |
| | | PP | 0 | | 1415 | | 10 | | 980 | |

[1] Based on 100 parts by mass of the total of (A) and (B)
[2] Room temperature (20° C.)

Comparative Example 5

The solid mass ratio of the resins of the polyolefin resin dispersion "E-1" and an acrylic resin water-based coating material (Aquaecol JW224 available from Toyo Ink Manufacturing Co., Ltd.) was adjusted to 5/95. Coating material "H-5" was prepared in the same manner as in Example 15 except for that, and the properties were evaluated. The results are shown in Table 4.

Comparative Example 6

Dispersion "S-1" was used. Coating material "H-6" was prepared in the same manner as in preparing the coating material of Example 15 except for that, and the properties were evaluated. The results are shown in Table 4.

Comparative Example 7

Dispersion "H-1" was used. Coating material "H-7" was prepared in the same manner as in preparing the coating material of Example 15 except for that, and the properties were evaluated. The results are shown in Table 4.

Comparative Example 8

Dispersion "S-2" was used. Coating material "H-8" was prepared in the same manner as in preparing the coating material of Example 15 except for that, and the properties were evaluated. The results are shown in Table 4.

Example 25

Aqueous dispersion "E-6" was applied to the corona-treated surface of a biaxially stretched Ny6 film (Emblem available from UNITIKA LTD., thickness 15 μm) so that the thickness after drying was 1 μm, and dried at 120° C. for 2 minutes to form an easy-to-adhere layer. After the coating material "J-1" was applied to the easy-to-adhere layer of the film and dried, the direct lamination suitability was evaluated. The direct lamination suitability to PE and PP was each 4240 mN/15 mm and 4400 mN/15 mm.

In Examples 15 to 24, the adhesion to polypropylene substrates and adhesion to various substrate films were excellent even under drying conditions of low temperature and short time. In addition, the direct lamination suitability was excellent. In Example 25, direct lamination strength was improved by forming an easy-to-adhere layer.

In Comparative Example 5, on the other hand, since the content of the polyolefin resin was out of the range of the present invention, the coating material was poor in adhesion to various substrates and direct lamination suitability. In Comparative Example 6, since the particle size of the polyolefin resin was greater than 1 μm, the coating material was poor in adhesion to polypropylene substrates in the case of low temperature drying. In Comparative Example 7, since the composition of the polyolefin resin was different from that of the present invention, the coating material was extremely poor in adhesion to substrate film and direct lamination suitability. In Comparative Example 8, since the composition of the polyolefin resin was different from that of the present invention, the coating material was poor in adhesion to substrate film and direct lamination suitability when the substrate film was polypropylene.

The invention claimed is:

1. An aqueous polyolefin resin dispersion comprising a polyolefin resin, a basic compound and an organic solvent, wherein the polyolefin resin contains 0.5 to 20% by mass of an unsaturated carboxylic acid unit, a propylene component, a butene component and an ethylene component, in which the component ratio is 8 to 90 parts by mass of the propylene component, 8 to 90 parts by mass of the butene component and 2 to 50 parts by mass of the ethylene component based on the total of the three components of 100 parts by mass, the basic compound has a boiling point of lower than 185° C. at normal pressure, and the amount of the basic compound is 0.5 to 3.0 equivalents based on the amount of carboxyl groups in the polyolefin resin, the aqueous dispersion contains substantially no water-compatibilizing agent having a boiling point of 185° C. or higher at normal pressure, the polyolefin resin has a number average particle size of 1 μm or smaller in the aqueous dispersion, and the organic solvent is present in an amount not more than 50% by mass, has a boiling point of lower than 185° C., and has solubility in water of not less than 10 g/L at 20° C.

2. An aqueous polyolefin resin dispersion comprising a polyolefin resin, a basic compound and an organic solvent, wherein the polyolefin resin contains 0.5 to 20% by mass of an unsaturated carboxylic acid unit, a propylene component, a butene component, an ethylene component and 20% by mass or less of a (meth)acrylic ester component, in which the component ratio is 8 to 90 parts by mass of the propylene component, 8 to 90 parts by mass of the butene component and 2 to 50 parts by mass of the ethylene component based on the total of the three components of 100 parts by mass, the basic compound has a boiling point of lower than 185° C. at normal pressure, and the amount of the basic compound is 0.5 to 3.0 equivalents based on the amount of carboxyl groups in the polyolefin resin, the aqueous dispersion contains substantially no water-compatibilizing agent having a boiling point of 185° C. or higher at normal pressure, the polyolefin resin has a number average particle size of 1 μm or smaller in the aqueous dispersion, and the organic solvent is present in an amount not more than 50% by mass, has a boiling point of lower than 185° C., and has solubility in water of not less than 10 g/L at 20° C.

3. An aqueous polyolefin resin dispersion comprising a polyolefin resin, a basic compound and an organic solvent, wherein the polyolefin resin consists of 0.5 to 20% by mass of an unsaturated carboxylic acid unit, a propylene component and an ethylene component only, the basic compound has a boiling point of lower than 185° C. at normal pressure, and the amount of the basic compound is 0.5 to 3.0 equivalents based on the amount of carboxyl groups in the polyolefin resin, the aqueous dispersion contains substantially no water-compatibilizing agent having a boiling point of 185° C. or higher at normal pressure, the polyolefin resin has a number average particle size of 1 μm or smaller in the aqueous dispersion, and the organic solvent is present in an amount not more than 50% by mass, has a boiling point of lower than 185° C., and has solubility in water of not less than 10 g/L at 20° C.

4. A water-based coating material comprising a polyolefin resin (A), another resin (B) as required, a pigment or a dye (C), a basic compound and an organic solvent, wherein the polyolefin resin (A) contains 0.5 to 20% by mass of an unsaturated carboxylic acid unit, a propylene component, a butene component and an ethylene component, in which the component ratio is 8 to 90 parts by mass of the propylene component, 8 to 90 parts by mass of the butene component and 2 to 50 parts by mass of the ethylene component based on the total of the three components of 100 parts by mass, the water-based coating material has a mass ratio of (A) to (B), (A)/(B), of 100/0 to 10/90, the basic compound has a boiling point of lower than 185° C. at normal pressure, and the amount of the basic compound is 0.5 to 3.0 equivalents based on the amount of carboxyl groups in the polyolefin resin (A), the water-based coating material contains substantially no water-compatibilizing agent having a boiling point of 185° C. or higher at normal pressure, the polyolefin resin (A) has a number average particle size of 1 μm or smaller, and the organic solvent is present in an amount not more than 50% by mass, has a boiling point of lower than 185° C., and has solubility in water of not less than 10 g/L at 20° C.

5. A water-based coating material comprising a polyolefin resin (A), another resin (B) as required, a pigment or a dye (C), a basic compound and an organic solvent, wherein the polyolefin resin (A) contains 0.5 to 20% by mass of an unsaturated carboxylic acid unit, a propylene component, a butene component, an ethylene component and 20% by mass or less of a (meth)acrylic ester component, in which the component ratio is 8 to 90 parts by mass of the propylene component, 8 to 90 parts by mass of the butene component and 2 to 50 parts by mass of the ethylene component based on the total of the three components of 100 parts by mass, the water-based coating material has a mass ratio of (A) to (B), (A)/(B), of 100/0 to 10/90, the basic compound has a boiling point of lower than 185° C. at normal pressure, and the amount of the basic compound is 0.5 to 3.0 equivalents based on the amount of carboxyl groups in the polyolefin resin (A), the water-based coating material contains substantially no water-compatibilizing agent having a boiling point of 185° C. or higher at normal pressure, the polyolefin resin (A) has a number average particle size of 1 μm or smaller, and the organic solvent is present in an amount not more than 50% by mass, has a boiling point of lower than 185° C., and has solubility in water of not less than 10 g/L at 20° C.

6. A water-based coating material comprising a polyolefin resin (A), another resin (B) as required, a pigment or a dye (C), a basic compound and an organic solvent, wherein the polyolefin resin (A) consists of 0.5 to 20% by mass of an unsaturated carboxylic acid unit, a propylene component and an ethylene component only, the water-based coating material has a mass ratio of (A) to (B), (A)/(B), of 100/0 to 10/90, the basic compound has a boiling point of lower than 185° C. at normal pressure, and the amount of the basic compound is 0.5 to 3.0 equivalents based on the amount of carboxyl groups in the polyolefin resin (A), the water-based coating material contains substantially no water-compatibilizing agent having a boiling point of 185° C. or higher at normal pressure, the polyolefin resin (A) has a number average particle size of 1 μm or smaller, and the organic solvent is present in an amount not more than 50% by mass, has a boiling point of lower than 185° C., and has solubility in water of not less than 10 g/L at 20° C.

* * * * *